United States Patent
Li et al.

(10) Patent No.: US 11,855,723 B2
(45) Date of Patent: Dec. 26, 2023

(54) BEAMFORMING TRAINING METHOD AND APPARATUS

(71) Applicant: Huawei Technologies Co., Ltd., Shenzhen (CN)

(72) Inventors: Dejian Li, Beijing (CN); Jinnan Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 198 days.

(21) Appl. No.: 17/375,656

(22) Filed: Jul. 14, 2021

(65) Prior Publication Data
US 2021/0409084 A1 Dec. 30, 2021

Related U.S. Application Data

(63) Continuation of application No. 16/399,079, filed on Apr. 30, 2019, now Pat. No. 11,088,743, which is a (Continued)

(30) Foreign Application Priority Data

Nov. 3, 2016 (CN) .......................... 201610956679.0

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0619* (2013.01); *H04B 7/0695* (2013.01);
(Continued)

(58) Field of Classification Search
CPC .. H04B 7/0617; H04B 7/0619; H04B 7/0695; H04B 7/088; H04B 7/086; H04W 16/28; H04W 72/23
See application file for complete search history.

(56) References Cited

U.S. PATENT DOCUMENTS

2007/0121751 A1 5/2007 Li et al.
2007/0286303 A1 12/2007 Yamaura
(Continued)

FOREIGN PATENT DOCUMENTS

CN 101218758 A 7/2008
CN 102177742 A 9/2011
(Continued)

OTHER PUBLICATIONS

"Reducing the LOS Ray Beamforming Setup Time for IEEE 802.11ad and IEEE 802.15.3c", Yavuz Yaman and Predrag Spasojevic, IEEE, 2016 (Year: 2016).*
(Continued)

*Primary Examiner* — Habte Mered
(74) *Attorney, Agent, or Firm* — Conley Rose, P.C.

(57) ABSTRACT

A beamforming training method includes sending, by a first device, first indication information to a second device, where the first indication information instructs the second device to not perform an initiator sector sweep (ISS), sending, by the first device, a sector sweep frame of a responder sector sweep (RSS) to the second device, and receiving, by the first device, feedback information obtained by the second device during the RSS.

20 Claims, 15 Drawing Sheets

Related U.S. Application Data continuation of application No. PCT/CN2017/109120, filed on Nov. 2, 2017.

(51) Int. Cl.
*H04B 7/08* (2006.01)
*H04W 72/23* (2023.01)

(52) U.S. Cl.
CPC ............ *H04B 7/088* (2013.01); *H04W 16/28* (2013.01); *H04W 72/23* (2023.01)

(56) References Cited

U.S. PATENT DOCUMENTS

| | | |
|---|---|---|
| 2010/0214169 A1 | 8/2010 | Kafle |
| 2013/0107893 A1 | 5/2013 | Zhang |
| 2013/0329718 A1* | 12/2013 | Liu ..................... H04B 7/0695 370/338 |
| 2014/0112317 A1 | 4/2014 | Liu et al. |
| 2014/0177543 A1* | 6/2014 | Cordeiro ............. H04B 7/0623 370/328 |
| 2015/0244432 A1* | 8/2015 | Wang ................... H04B 7/0417 375/267 |
| 2016/0044711 A1 | 2/2016 | Lou et al. |
| 2016/0119046 A1 | 4/2016 | Trainin et al. |
| 2016/0255660 A1 | 9/2016 | Son et al. |
| 2017/0026099 A1 | 1/2017 | Levy et al. |
| 2017/0111099 A1 | 4/2017 | Levy et al. |
| 2017/0126302 A1* | 5/2017 | Sanderovich ....... H04L 45/7453 |
| 2017/0126303 A1* | 5/2017 | Jo ........................ H04B 7/0621 |
| 2017/0134076 A1* | 5/2017 | Maamari .............. H04B 7/0617 |
| 2018/0088225 A1 | 3/2018 | Karls et al. |
| 2020/0044337 A1* | 2/2020 | Abdallah ............... H04B 7/088 |

FOREIGN PATENT DOCUMENTS

| | | |
|---|---|---|
| CN | 102326338 A | 1/2012 |
| CN | 103999392 A | 8/2014 |
| CN | 105052235 A | 11/2015 |
| CN | 105453674 A | 3/2016 |
| CN | 105656533 A | 6/2016 |
| CN | 105981310 A | 9/2016 |
| CN | 105993134 A | 10/2016 |
| WO | 2016115084 A1 | 7/2016 |
| WO | 2016160727 A1 | 10/2016 |
| WO | 2016164060 A1 | 10/2016 |

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," IEEE Std 802.11ad™, Dec. 28, 2012, 628 pages.

* cited by examiner

BEAMFORMING TRAINING METHOD AND APPARATUS

CROSS-REFERENCE TO RELATED APPLICATIONS

This application is a continuation of U.S. patent application Ser. No. 16/399,079 filed on Apr. 30, 2019, which is a continuation of International Patent Application No. PCT/CN2017/109120 filed on Nov. 2, 2017, which claims priority to Chinese Patent Application No. 201610956679.0 filed on Nov. 3, 2016. All of the aforementioned patent applications are hereby incorporated by reference in their entireties.

TECHNICAL FIELD

This application relates to the field of beamforming training technologies, and in particular, to a beamforming training method and apparatus.

BACKGROUND

A millimeter-wave band is a high-frequency communication band, and a propagation loss is very large. Therefore, a gain of a transmit antenna and/or a gain of a receive antenna are/is usually used to compensate for a path loss. The transmit antenna and the receive antenna usually form a directional beam using an antenna array having a large-scale antenna array element or a group of switchable beam antennas, and a transmit beam and a receive beam that are aligned between the transmit antenna and the receive antenna are formed through beamforming training in order to close a communication link or expand coverage. Therefore, a procedure of simulating beamforming training is designed in some millimeter wave technical standards. For example, the Institute of Electrical and Electronics Engineers (IEEE) 802.11ad and 802.11ay standards for a 60 gigahertz (GHz) band include a sector level sweep (SLS) phase and a Beam Refinement Protocol (BRP) phase. The SLS phase is an inevitable phase for initial establishment of a beam link. In this phase, at least a best transmit sector of each communication party can be determined. In the BRP phase, based on the best sector obtained in the SLS phase, beamforming training is further performed to obtain best antenna configurations and best beam link gains of the transmit and receive parties.

In the 802.11ad standard, SLS beamforming training includes a maximum of four parts, an initiator sector sweep (ISS) used for initiator beam training, a responder sector sweep (RSS) used for responder beam training, a sector sweep (also referred to as SSW) feedback (SSW-Feedback) step, and an SSW acknowledgment (SSW-Ack) step. When beamforming training is performed according to the standard, a device serving as a beam training initiator and a device serving as a beam training responder form an SLS training group through information exchange. SLS training between the initiator device and the responder device in the SLS training group always includes two parts an ISS and an RSS.

The beamforming training always includes two parts the ISS and the RSS, and is suitable for one-to-one training of a pair of devices. However, the SLS phase training is inflexible, which is not beneficial to expanding beamforming training to more devices in real time and reducing total duration of beamforming training between a plurality of devices.

SUMMARY

Embodiments of the present disclosure provide a beamforming training method and apparatus in order to improve beamforming training flexibility.

According to a first aspect, an embodiment of the present disclosure provides a beamforming training method, including sending, by a first device, first indication information to a second device, where the first indication information indicates the second device not to perform an RSS, sending, by the first device, a sector sweep frame of an ISS to the second device, and receiving, by the first device, feedback information obtained by the second device during the ISS.

In the other approaches solution, beamforming training always includes two parts, an ISS and an RSS, causing SLS training inflexibility. In the solution in this embodiment of the present disclosure, the first device sends, to the second device, the first indication information used to indicate the second device not to perform the RSS training. Therefore, after the first device sends the sector sweep frame of the ISS to the second device, the second device performs ISS training based on the received sector sweep frame and no longer performs the responder RSS training. It can be learned that, in the solution in this embodiment of the present disclosure, the ISS and the RSS may be separately performed such that beamforming training flexibility can be improved.

In the solution in this embodiment of the present disclosure, the first device may directly send the first indication information to the second device using a straight-through link. Alternatively, the first device first includes the first indication information in beamforming training request information and sends the first indication information to a wireless access point (AP)/personal basic service set control point (PCP), and then the AP/PCP sends the first indication information to the second device when allocating a channel transmission resource, to be specific, forwards the first indication information to the second device by including the first indication information in scheduling information of the AP/PCP.

In a possible design, before sending, by the first device, a sector sweep frame of an ISS to the second device, the method further includes receiving, by the first device, a sector sweep frame of first beamforming training of the second device, where an address of the first device does not match a receive address of the sector sweep frame of the first beamforming training, and determining, by the first device, sector selection information or signal-to-noise ratio (SNR) information of the first beamforming training based on the received sector sweep frame of the second device.

In the other approaches solution, only a device in a beamforming training group, namely, only a device whose address falls within a receive address range of a sector sweep frame sent by a beamforming training initiator (corresponding to the second device), can receive the sector sweep frame sent by the second device. However, in the solution in this embodiment of the present disclosure, the first device whose address does not match the receive address of the sector sweep frame of the first beamforming training may also receive the sector sweep frame of the first beamforming training to perform beamforming training such that a device outside the beamforming training group can also perform beamforming training, thereby increasing beamforming training flexibility.

Optionally, the second device is not limited to a beamforming training initiator, or may be a beamforming training responder in a beamforming training group.

Optionally, the first beamforming training and the ISS training of the first device in the foregoing design may be separately performed in terms of time, and may be combined into a complete beamforming training process.

In a possible design, the first beamforming training includes an ISS and/or the RSS of the second device.

In a possible design, the determining, by the first device, sector selection information or SNR information of the first beamforming training based on the received sector sweep frame of the second device includes determining, by the first device, the sector selection information of the second device based on the sector sweep frame of the second device when the first beamforming training includes a transmit sector sweep (TXSS) of the second device.

In a possible design, determining, by the first device, sector selection information or SNR information of the first beamforming training based on the received sector sweep frame of the second device includes determining, by the first device, whether a quantity of sector sweep frames sent by the second device is greater than or equal to a quantity of receive sectors that the first device needs to sweep when the first beamforming training includes a receive sector sweep (RXSS) of the second device, and if the quantity of sector sweep frames sent by the second device is greater than or equal to the quantity of receive sectors that the first device needs to sweep, determining, by the first device, SNR information of a transmit sector of the first device based on the received sector sweep frame of the second device.

In a possible design, the method further includes, if the quantity of sector sweep frames sent by the second device is less than the quantity of receive sectors to be swept by the first device, sending, by the first device, second indication information to the second device, where the second indication information is used to indicate RXSS length information of a responder RXSS of the second device after the ISS of the first device.

In this embodiment of the present disclosure, when the quantity of sector sweep frames sent by the second device is less than the quantity of receive sectors to be swept by the first device, the second device performs RXSS training after the ISS training of the first device based on the second indication information sent by the first device such that the second device performs RSS training based on an actual requirement, beamforming training flexibility is improved, and total beamforming training time is reduced.

In a possible design, the first indication information is indication information used to indicate the second device not to perform a responder TXSS and/or a responder RXSS after the ISS of the first device.

In a possible design, the first indication information is included in a sector sweep SSW frame or a short SSW frame of the ISS of the first device, or included in a grant frame or a service period (SP) request frame.

In a possible design, the first indication information is the sector selection information or the SNR information.

In an implementation of this embodiment of the present disclosure, the first device sends the first indication information and the sector sweep frame of the ISS to the second device without considering a time sequence. That is, in a possible implementation, the first indication information and the sector sweep frame of the ISS are separately sent. For example, the first indication information is included in the grant frame or the SP request (also referred to as SPR) frame. In another possible implementation, the first indication information and the sector sweep frame of the ISS may be sent together. For example, the first indication information is included in the sector sweep SSW frame or the short SSW frame of the ISS.

In terms of content of the first indication information, the first indication information may be the sector selection information or the SNR information, and the first indication information implicitly indicates that the RSS is no longer performed.

In a possible design, before sending, by the first device, the first indication information, the method further includes determining, by the first device, that when the ISS of the first device ends, the sector selection information is within a preset beam link maintenance time.

In a possible design, after receiving, by the first device, feedback information obtained by the second device during the ISS, the method further includes sending, by the first device, a sector sweep frame of second beamforming training to the second device, and receiving, by the first device, sector selection information or SNR information, based on the second beamforming training, of the second device.

In an implementation solution of the other approaches, beamforming training always includes two parts, an ISS and an RSS. In this implementation, only a sending link and a receiving link of the first device may be trained, thereby improving beamforming training flexibility.

In a possible design, the ISS of the first device is an initiator TXSS, and the second beamforming training is an initiator RXSS, or the ISS of the first device is an initiator RXSS, and the second beamforming training is an initiator TXSS.

According to a second aspect, an embodiment of the present disclosure provides a beamforming training method, including sending, by a first device, beamforming training request information to a second device, where the beamforming training request information includes at least one type of training phase information, channel number information, channel bandwidth information, channel transmission mode information, and information about a quantity of spatial flows of a training sequence, receiving, by the first device, configuration information fed back by the second device based on the beamforming training request information, and performing, by the first device, beamforming training based on the configuration information.

In an existing beamforming training method, when requesting a channel resource, a beamforming training initiator does not differentiate channel characteristics. In the solution in this embodiment of the present disclosure, when requesting or negotiating a beamforming training resource, a beamforming training initiator (corresponding to the first device) includes one or more types of the training phase information, the channel number information, the channel bandwidth information, the channel transmission mode information, and the information about a quantity of spatial flows of a training sequence in the beamforming training request information in order to request the second device to allocate or negotiate to determine a channel with a characteristic specified in the request information for beamforming training.

An implementation of this embodiment of the present disclosure may be applied to a process in which an initiator in a beamforming training group requests a resource, or may be applied to a process in which a device outside the beamforming training group requests a resource as an initiator.

In a possible design, the beamforming training request information is included in an SP request frame, a grant frame, or a grant acknowledgment frame.

In a possible design, the training phase information is used to indicate an SLS phase or a BRP phase.

In this implementation, the training phase information in the beamforming training request information indicates the SLS phase or the BRP phase such that the second device allocates a channel resource corresponding to a corresponding training phase.

In a possible design, the channel number information is used to indicate whether a channel with a specified number is requested for beamforming training.

In this implementation, the channel number information is used to indicate whether the channel with the specified number is requested such that the second device allocates the channel with the specified number for beamforming training.

In a possible design, when the channel number information indicates that the channel with the specified number is requested, or when the training phase information indicates the BRP phase, the channel bandwidth information is used to indicate one or more channel numbers, and when the channel number information indicates that the channel with the specified number is not requested, or when the training phase information indicates the SLS phase, the channel bandwidth information is used to indicate a channel bandwidth.

In a possible design, the channel transmission mode information is used to indicate whether a beamforming training sequence uses a channel aggregation mode or a channel bonding mode.

In a possible design, when the training phase information indicates the BRP phase, the information about a quantity of spatial flows of a training sequence is used to indicate a quantity of transmit spatial flows of a training field.

According to a third aspect, an embodiment of the present disclosure provides a beamforming training method, including receiving, by a second device, beamforming training request information sent by a first device, where the beamforming training request information includes at least one type of training phase information, channel number information, channel bandwidth information, channel transmission mode information, and information about a quantity of spatial flows of a training sequence, and allocating, by the second device to the first device based on the beamforming training request information, a channel used for beamforming training.

In an existing beamforming training method, when requesting a channel resource, a beamforming training initiator does not differentiate channel characteristics. Correspondingly, when allocating a channel according to a request of the first device, the second device does not differentiate channel resource characteristics. In the solution in this embodiment of the present disclosure, when requesting or negotiating a beamforming training resource, a beamforming training initiator (corresponding to the first device) includes one or more types of the training phase information, the channel number information, the channel bandwidth information, the channel transmission mode information, and the information about a quantity of spatial flows of a training sequence in the beamforming training request information. Therefore, when allocating a channel resource to the first device or negotiating with the first device to determine a channel resource, the second device allocates a channel resource based on a channel characteristic specified in the beamforming training request information.

In a possible design, the beamforming training request information includes the training phase information and/or the channel number information, and further includes the channel bandwidth information, when the training phase information indicates an SLS phase, and/or the channel number information in the beamforming training request information indicates that a channel with a specified number is not requested, the channel bandwidth information is used to indicate a channel bandwidth, and allocating, by the second device to the first device based on the beamforming training request information, a channel used for beamforming training includes allocating, by the second device to the first device, a channel whose channel bandwidth is less than or equal to the channel bandwidth indicated by the channel bandwidth information.

In a possible design, the beamforming training request information includes the training phase information and/or the channel number information, and further includes the channel bandwidth information, when the training phase information indicates a BRP phase, and/or the channel number information in the beamforming training request information indicates that a channel with a specified number is requested, the channel bandwidth information is used to indicate one or more channel numbers, and allocating, by the second device to the first device based on the beamforming training request information, a channel used for beamforming training includes allocating, by the second device to the first device, at least one channel whose channel number is indicated by the channel bandwidth information.

In a possible design, the beamforming training request information includes the channel bandwidth information, and the channel bandwidth information indicates zero, and the allocating, by the second device to the first device based on the beamforming training request information, a channel used for beamforming training includes allocating, by the second device, any single channel to the first device.

In a possible design, the beamforming training request information includes the channel transmission mode information, and the channel transmission mode information is used to indicate whether a beamforming training sequence uses a channel aggregation mode or a channel bonding mode, and the allocating, by the second device to the first device based on the beamforming training request information, a channel used for beamforming training includes allocating, by the second device to the first device, a channel whose channel mode is the same as a channel mode indicated by the channel transmission mode information.

In a possible design, the beamforming training request information includes the information about a quantity of spatial flows of a training sequence and the training phase information, and when the training phase information indicates the BRP phase, the information about a quantity of spatial flows of a training sequence is used to indicate a quantity of transmit spatial flows of a training field, and allocating, by the second device to the first device based on the beamforming training request information, a channel used for beamforming training includes allocating, by the second device to the first device, a channel for BRP training and with a quantity of spatial flows the same as the quantity of spatial flows indicated by the information about a quantity of spatial flows of a training sequence.

According to a fourth aspect, an embodiment of the present disclosure provides a beamforming training apparatus, where the apparatus is deployed on a first device, and the apparatus has a function of implementing behavior of the first device in the beamforming training method design of the first aspect. The function may be implemented by hardware, or may be implemented by hardware executing corresponding software. The hardware or the software includes one or more modules corresponding to the function. The module may be software and/or hardware.

In a possible design, the beamforming training apparatus includes a sending unit and a receiving unit, the sending unit is configured to send first indication information to a second device, where the first indication information indicates the second device not to perform an RSS, and send a sector sweep frame of an ISS to the second device, and the receiving unit is configured to receive feedback information obtained by the second device during the ISS.

In a possible design, before the sending unit sends the sector sweep frame of the ISS to the second device, the receiving unit is further configured to receive a sector sweep frame of first beamforming training of the second device, where an address of the first device does not match a receive address of the sector sweep frame of the first beamforming training, and the apparatus further includes a first processing unit configured to determine sector selection information or SNR information of the first beamforming training based on the received sector sweep frame of the second device.

In a possible design, the first beamforming training includes an ISS and/or the RSS of the second device.

In a possible design, that the first processing unit determines sector selection information or SNR information of the first beamforming training based on the received sector sweep frame of the second device includes determining the sector selection information of the second device based on the sector sweep frame of the second device when the first beamforming training includes a TXSS of the second device.

In a possible design, that the first processing unit determines sector selection information or SNR information of the first beamforming training based on the received sector sweep frame of the second device includes determining whether a quantity of sector sweep frames sent by the second device is greater than or equal to a quantity of receive sectors that the first device needs to sweep when the first beamforming training includes an RXSS of the second device, and if the quantity of sector sweep frames sent by the second device is greater than or equal to the quantity of receive sectors that the first device needs to sweep, determining SNR information of a transmit sector of the first device based on the received sector sweep frame of the second device.

In a possible design, if the quantity of sector sweep frames sent by the second device is less than the quantity of receive sectors to be swept by the first device, the sending unit is further configured to send second indication information to the second device, where the second indication information is used to indicate RXSS length information of a responder RXSS of the second device after the ISS of the first device.

In a possible design, the first indication information is indication information used to indicate the second device not to perform a responder TXSS and/or a responder RXSS after the ISS of the first device.

In a possible design, the first indication information is included in a sector sweep SSW frame or a short SSW frame of the ISS of the first device, or included in a grant frame or an SP request frame.

In a possible design, the first indication information is the sector selection information or the SNR information.

In a possible design, the apparatus further includes a second processing unit configured to, before the sending unit sends the first indication information, determine that when the ISS of the first device ends, the sector selection information is within a preset beam link maintenance time.

In a possible design, after the receiving unit receives the feedback information obtained by the second device during the ISS, the sending unit is further configured to send a sector sweep frame of the second beamforming training to the second device, and the receiving unit is further configured to receive sector selection information or SNR information, based on the second beamforming training, of the second device.

In a possible design, the ISS of the first device is an initiator TXSS, and the second beamforming training is an initiator RXSS, or the ISS of the first device is an initiator RXSS, and the second beamforming training is an initiator TXSS.

In another possible design, the beamforming training apparatus includes a receiver, a transmitter, and a processor, the receiver is configured to implement a function of the receiving unit in the embodiment of the fourth aspect, the transmitter is configured to implement a function of the sending unit in the embodiment of the fourth aspect, and the processor is configured to implement functions of the first processing unit and the second processing unit in the embodiment of the fourth aspect.

According to a fifth aspect, an embodiment of the present disclosure provides a beamforming training apparatus, where the apparatus is deployed on a first device, and the apparatus has a function of implementing behavior of the first device in the beamforming training method design of the second aspect. The function may be implemented by hardware, or may be implemented by hardware by executing corresponding software. The hardware or the software includes one or more modules corresponding to the function. The module may be software and/or hardware.

In a possible design, the beamforming training apparatus includes a sending unit, a receiving unit, and a beamforming training unit, the sending unit is configured to send beamforming training request information to a second device, where the beamforming training request information includes at least one type of the following information training phase information, channel number information, channel bandwidth information, channel transmission mode information, and information about a quantity of spatial flows of a training sequence, the receiving unit is configured to receive configuration information fed back by the second device based on the beamforming training request information, and the beamforming training unit is configured to perform beamforming training based on the configuration information.

In a possible design, the beamforming training request information is included in an SP request frame, a grant frame, or a grant acknowledgment frame.

In a possible design, the training phase information is used to indicate an SLS phase or a BRP phase.

In a possible design, the channel number information is used to indicate whether a channel with a specified number is requested for beamforming training.

In a possible design, when the channel number information indicates that the channel with the specified number is requested, or when the training phase information indicates the BRP phase, the channel bandwidth information is used to indicate one or more channel numbers, and when the channel number information indicates that the channel with the specified number is not requested, or when the training phase information indicates the SLS phase, the channel bandwidth information is used to indicate a channel bandwidth.

In a possible design, the channel transmission mode information is used to indicate whether a beamforming training sequence uses a channel aggregation mode or a channel bonding mode.

In a possible design, when the training phase information indicates the BRP phase, the information about a quantity of spatial flows of a training sequence is used to indicate a quantity of transmit spatial flows of a training field.

In another possible design, the beamforming training apparatus includes a receiver, a transmitter, and a processor, the receiver is configured to implement a function of the receiving unit in the embodiment of the fifth aspect, the transmitter is configured to implement a function of the sending unit in the embodiment of the fifth aspect, and the processor is configured to implement a function of the beamforming training unit in the embodiment of the fifth aspect.

According to a sixth aspect, an embodiment of the present disclosure provides a beamforming training apparatus, where the apparatus is deployed on a second device, and the apparatus has a function of implementing behavior of the second device in the beamforming training method design of the third aspect. The function may be implemented by hardware, or may be implemented by hardware by executing corresponding software. The hardware or the software includes one or more modules corresponding to the function. The module may be software and/or hardware.

In a possible design, the beamforming training apparatus includes a receiving unit and an allocation unit, the receiving unit is configured to receive beamforming training request information sent by a first device, where the beamforming training request information includes at least one type of the following information training phase information, channel number information, channel bandwidth information, channel transmission mode information, and information about a quantity of spatial flows of a training sequence, and the allocation unit is configured to allocate, to the first device based on the beamforming training request information, a channel used for beamforming training.

In a possible design, the beamforming training request information includes the training phase information and/or the channel number information, and further includes the channel bandwidth information, when the training phase information indicates an SLS phase, and/or the channel number information in the beamforming training request information indicates that a channel with a specified number is not requested, the channel bandwidth information is used to indicate a channel bandwidth, and that the allocation unit allocates, to the first device based on the beamforming training request information, a channel used for beamforming training includes allocating, to the first device, a channel whose channel bandwidth is less than or equal to the channel bandwidth indicated by the channel bandwidth information.

In a possible design, the beamforming training request information includes the training phase information and/or the channel number information, and further includes the channel bandwidth information, when the training phase information indicates a BRP phase, and/or the channel number information in the beamforming training request information indicates that a channel with a specified number is requested, the channel bandwidth information is used to indicate one or more channel numbers, and that the allocation unit allocates, to the first device based on the beamforming training request information, a channel used for beamforming training includes allocating, to the first device, at least one channel whose channel number is indicated by the channel bandwidth information.

In a possible design, the beamforming training request information includes the channel bandwidth information, and the channel bandwidth information indicates zero, and allocating, by the second device to the first device based on the beamforming training request information, a channel used for beamforming training includes allocating, by the second device, any single channel to the first device.

In a possible design, the beamforming training request information includes the channel transmission mode information, and the channel transmission mode information is used to indicate whether a beamforming training sequence uses a channel aggregation mode or a channel bonding mode, and that the allocation unit allocates, to the first device based on the beamforming training request information, a channel used for beamforming training includes allocating, to the first device, a channel whose channel mode is the same as a channel mode indicated by the channel transmission mode information.

In a possible design, the beamforming training request information includes the information about a quantity of spatial flows of a training sequence and the training phase information, and when the training phase information indicates the BRP phase, the information about a quantity of spatial flows of a training sequence is used to indicate a quantity of transmit spatial flows of a training field, and that the allocation unit allocates, to the first device based on the beamforming training request information, a channel used for beamforming training includes allocating, to the first device, a channel for BRP training and with a quantity of spatial flows the same as the quantity of spatial flows indicated by the information about a quantity of spatial flows of a training sequence.

In another possible design, the beamforming training apparatus includes a receiver, a transmitter, and a processor, the receiver is configured to implement a function of the receiving unit in the embodiment of the sixth aspect, the transmitter is configured to implement a function of the sending unit in the embodiment of the sixth aspect, and the processor is configured to implement a function of the allocation unit in the embodiment of the sixth aspect.

According to a seventh aspect, an embodiment of the present disclosure provides a computer storage medium configured to store a computer software instruction used by the beamforming training apparatus according to the fourth aspect. The computer software instruction includes a program designed for performing the first aspect.

According to an eighth aspect, an embodiment of the present disclosure provides a computer storage medium configured to store a computer software instruction used by the beamforming training apparatus according to the fifth aspect. The computer software instruction includes a program designed for performing the second aspect.

According to a ninth aspect, an embodiment of the present disclosure provides a computer storage medium configured to store a computer software instruction used by the beamforming training apparatus according to the sixth aspect.

DESCRIPTION OF EMBODIMENTS

In a summary of an existing beamforming training method, beamforming training always includes two parts, an ISS and an RSS. Consequently, beamforming training is inflexible. To improve beamforming training flexibility, the embodiments of the present disclosure provide a beamforming training method. In the method, an ISS and an RSS of beamforming training may be performed separately.

Figure 1:
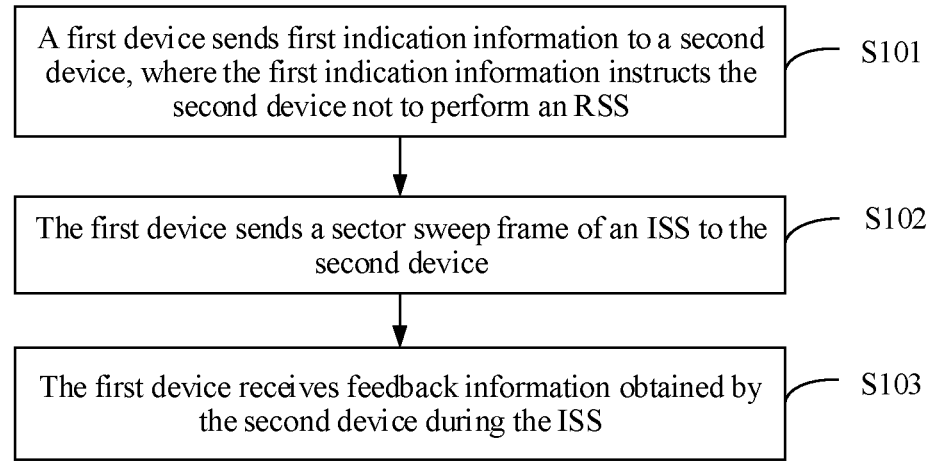
FIG. 1 is a flowchart of a beamforming training method according to Embodiment 1 of the present disclosure.

FIG. 1 is a flowchart of a beamforming training method according to Embodiment 1 of the present disclosure. As shown in FIG. 1, the method includes the following processing steps.

Step S101: A first device sends first indication information to a second device, where the first indication information indicates the second device not to perform an RSS.

Step S102: The first device sends a sector sweep frame of an ISS to the second device.

Step S103: The first device receives feedback information obtained by the second device during the ISS.

In the solution in this embodiment of the present disclosure, a sequence for performing step S101 and step S102 is not limited, and step S101 and step S102 may be simultaneously performed. For example, the sector sweep frame of the ISS sent by the first device to the second device includes the first indication information.

Further, the first device may directly send the first indication information to the second device using a straight-through link. Alternatively, the first device first includes the first indication information in beamforming training request information and sends the beamforming training request information to a wireless AP/PCP, and then the AP/PCP sends the beamforming training request information to the second device when allocating a channel transmission resource, to be specific, forwards the first indication information to the second device by including the first indication information in scheduling information of the AP/PCP.

In the solution in this embodiment of the present disclosure, the first device sends, to the second device, the first indication information used to indicate the second device not to perform the RSS. Therefore, after receiving the sector sweep frame of the ISS sent by the first device, the second device performs corresponding beamforming training based on the sector sweep frame of the ISS, while performing the RSS training is not necessary, thereby implementing separation between the ISS beamforming training and the RSS beamforming training, and improving beamforming training flexibility.

With reference to the solution of Embodiment 1, in another possible solution of the present disclosure, the first device may also perform partial beamforming training as a beamforming training responder. Optionally, the first device independently performs partial beamforming training as a device outside a beamforming training group. The first device may independently perform partial beamforming training as the device outside the beamforming training group before the first device sends the sector sweep frame of the ISS to the second device or after the first device sends the sector sweep frame of the ISS to the second device.

In an optional implementation solution, before the first device sends the sector sweep frame of the ISS to the second device, the first device receives a sector sweep frame of first beamforming training of the second device. An address of the first device does not match a receive address of the sector sweep frame of the first beamforming training. The first device determines sector selection information or SNR information of the first beamforming training based on the received sector sweep frame of the second device.

In the solution in this embodiment of the present disclosure, the first beamforming training may be an ISS and/or the RSS of the second device. Further, because the address of the first device does not match the receive address of the sector sweep frame of the first beamforming training, it may be considered that the first device is a device outside a corresponding beamforming training group, and the second device may be an initiator or a responder in the beamforming training group.

In the other approaches solution, only a device in a beamforming training group, namely, only a device whose address falls within a receive address range of a sector sweep frame sent by a beamforming training initiator (corresponding to the second device), can receive the sector sweep frame sent by the second device. However, in the solution in this embodiment of the present disclosure, the first device whose address does not match the receive address of the sector sweep frame of the first beamforming training may also receive the sector sweep frame of the first beamforming training to perform beamforming training such that a device outside the beamforming training group can also perform beamforming training, thereby increasing beamforming training flexibility.

To describe this embodiment of the present disclosure in detail, the following describes beamforming training of the present disclosure with reference to a specific scenario and one beamforming training instance in the specific scenario.

It may be understood that the following specific scenario and the beamforming training instance in the scenario do not limit a beamforming training scenario and a beamforming training process in this embodiment of the present disclosure. For example, in the following scenario, the first device (corresponding to a STA4 in the following scenario) participates in beamforming training as a device outside a beamforming training group. In some application scenarios, the first device may also participate in beamforming training as a device in the beamforming training group. For example, an initiator in the beamforming training group indicates each responder in the training group to perform an ISS only, and not to perform an RSS. In addition, the ISS training of the first device and the first beamforming training performed by the first device as a device outside the beamforming training group in the foregoing embodiment may be separately performed. In the following specific beamforming training instance, to fully describe two processes in detail the ISS training of the first device and the first beamforming training of the first device serving as a device outside the beamforming training group, the two processes are combined for description.

Figure 2:
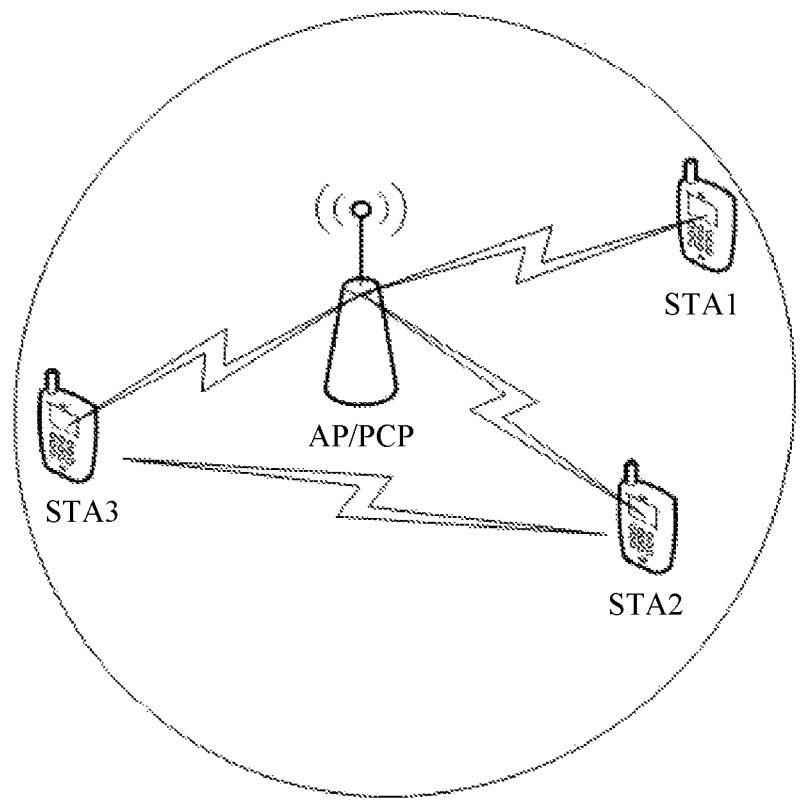
FIG. 2 is a schematic diagram of a possible application scenario of the present disclosure.

FIG. 2 is a schematic diagram of a possible application scenario of the present disclosure. As shown in FIG. 2, the scenario includes an AP/PCP and a plurality of user equipments. The plurality of user equipments may directly communicate with each other or perform communication through scheduling of the AP/PCP.

The user equipment mentioned in this application may include various handheld devices, in-vehicle devices, wearable devices, or computing devices having a wireless communication function, or other processing devices connected to a wireless modem, and various forms of user equipments (also referred to as UE), mobile stations (MSs), terminals, terminal equipment, STAs, and the like. For ease of description and detailed description of this embodiment of the present disclosure, a STA is used as an example for description in this application.

In the scenario shown in FIG. 2, the user equipments are a STA1, a STA2, and a STA3. The STA1 serves as a beamforming training initiator, the STA2 and the STA3 serve as beamforming training responders, and the STA1, the STA2, and the STA3 form an SLS training group. It should be noted that a total quantity of member STAs (including the initiator STAs and all responder STAs) in the SLS training group should be greater than or equal to two.

Figure 3:
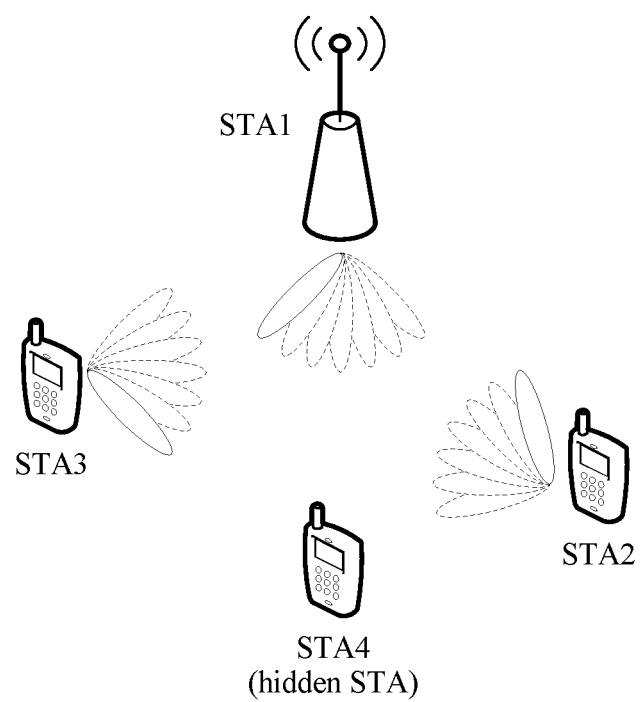
FIG. 3 is a schematic diagram of another possible application scenario based on FIG. 2.

As shown in FIG. 3, a STA4 is an out-of-group STA that does not join the SLS training group. An address of the STA4 does not match a receive address of an SSW frame/short SSW frame sent by the STA1. Because the STA4 is not in an SLS training process of the STA1, the STA2, and the STA3, the STA4 may be considered as a "hidden STA". The receive address of the SSW frame/short SSW frame may be represented by one of a Media Access Control (MAC) address of an individual type or a group type and a group address identifier (also referred to as ID) (Group ID).

Based on a scenario shown in FIG. 3, this embodiment of the present disclosure provides a specific instance of the beamforming training method. According to the beamforming training method in this embodiment of the present disclosure, a beamforming training procedure and protocol in an SLS phase of 802.11ad are improved, to split an ISS and an RSS into phases that can be independently completed and separately performed in terms of time such that a STA (for example, the STA4 in FIG. 3) whose address does not match a receive address of a beamforming training frame may also participate in beamforming training in the ISS and/or RSS phase in real time as required, and skip completed beamforming training in a subsequent SLS training, thereby reducing training duration.

In addition, when an RXSS is usually performed in a BRP phase, in the beamforming training method in this embodiment of the present disclosure, a multiple sector identifier (MID) subphase of the BRP may also be used for "one-to-many" beamforming training.

In the solution in this embodiment of the present disclosure, during beamforming training, possible reasons for including the STA that does not belong to the SLS training group are as follows.

(1) The STA4 does not obtain a transmission opportunity to send a request to the initiator STA1 or an AP/PCP or negotiate to join the SLS training group. For example, the STA4 wants to perform SLS training with the STA1. However, before the STA1 obtains a transmission opportunity (TXOP)/SP used for the SLS training group, the STA4 fails to obtain a channel access opportunity to send an SLS training request message to the STA1, the AP, or the PCP. This is likely to occur in a BSS with intensive STA deployment or heavy service load. Because of intense channel access contention, the STA4 fails to obtain the channel access opportunity to send the SLS training request message to the STA1 or the AP/PCP.

(2) Due to insufficient channel resources, the AP/PCP fails to allocate a sufficiently long beamforming training time to the STA1 to complete SLS training with a plurality of STAs. In the 802.11ad standard, if there is no sufficient time to complete SLS phase training in a CBAP, a beamforming training initiator should not initiate SLS phase training in the CBAP. This indicates that if an initiator STA wants to initiate SLS training with a plurality of STAs at the same time, but if the initiator STA can complete an SLS with only some responder STAs in the plurality of responder STAs within a remaining time of the CBAP, remaining responder STAs cannot participate in the SLS training of the initiator STA, and therefore the remaining responder STAs become hidden STAs outside the SLS training group.

In addition, a reason that the ISS and the RSS need to be separated in terms of time for independent execution may be as follows.

(3) In an SLS in downlink multi-user multiple-input multiple-output (MU-MIMO), only transmit beam training of the STA1 and receive beam training of user equipment (for example, the STA2 and the STA3) need to be completed, and transmit beam training of the user equipment (for example, the STA2 and the STA3) does not need to be performed. For example, if the downlink MU-MIMO is used, a best transmit beam of the STA1 needs to be obtained through TXSS of an ISS, and a best receive beam of each user equipment needs to be obtained through RXSS of an ISS. That is, only two ISSs are required without an RSS.

To join an SLS training group, a STA needs to send SLS training request information to an initiator STA, an AP, or a PCP such that the initiator STA can request, based on a quantity of responder STAs in the SLS training group and a quantity of transmit/receive sectors that each responder STA needs to sweep, the AP or the PCP to allocate a sufficiently long time and a channel resource for beamforming training of the SLS training group. Therefore, if the STA fails to join in a timely manner, for the foregoing reasons, the SLS training group initiated by the initiator STA, the STA may serve as a "hidden STA" to participate in an SLS phase training with a target STA that wants to perform SLS training. The target STA may be the initiator STA, or may be any responder STA in the one or more responder STAs. The hidden STA is a STA whose address does not match a receive address of a beamforming training frame (for example, an SSW frame or a short SSW frame) sent by the initiator STA. The SLS training group includes one initiator STA and the one or more responder STAs. When there is only one responder STA in the SLS training group, the receive address of the beamforming training frame sent by the initiator STA is an individual address of the responder STA. Otherwise, when there are a plurality of responder STAs in the SLS training group, the receive address of the beamforming training frame sent by the initiator STA is a group address, and an address of each responder STA in the SLS training group belongs to the receive address of the beamforming training frame. The group address may be represented by a group MAC address or a group ID.

In the beamforming training in this embodiment of the present disclosure, the ISS and the RSS may be independently performed in a time-separated form such that a STA that is not a member of the beamforming training group can also directly participate in beamforming training in the ISS step and/or the RSS step. For a hidden STA, an SLS may be divided into two phases.

First phase SLS: ISS or RSS training of an initiator STA or a responder STA with a hidden responder STA.

Figure 4:
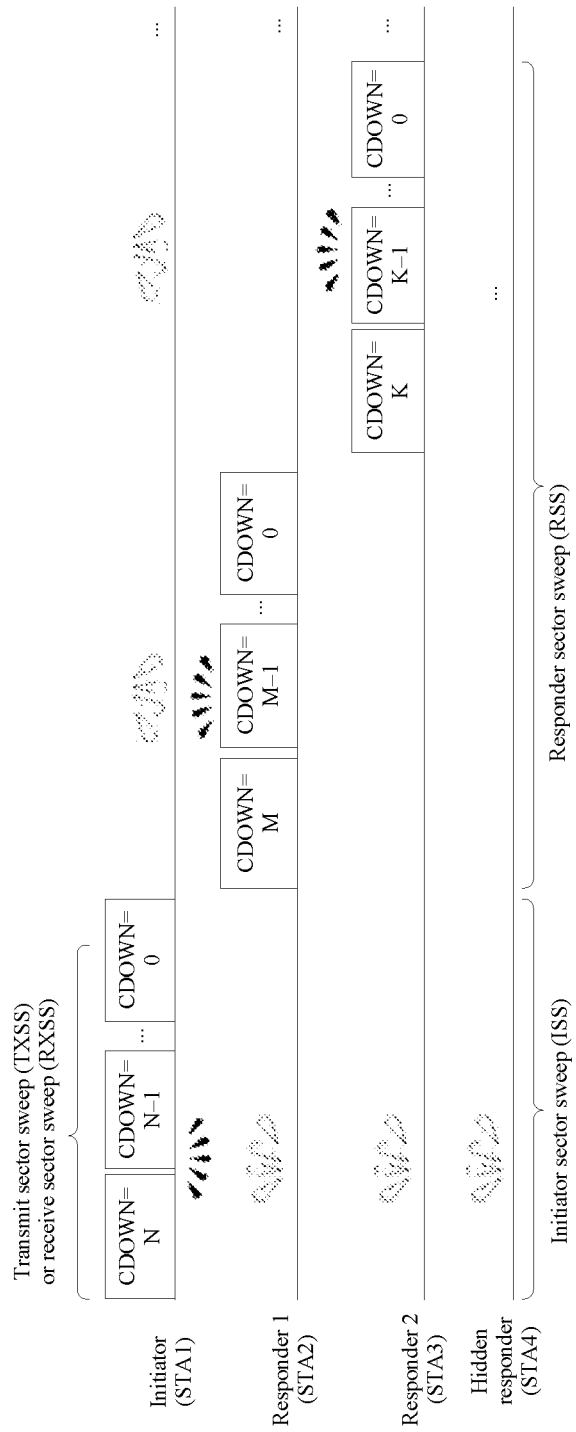
FIG. 4 is a flowchart in which a hidden device participates in beamforming training as a responder.

As shown in FIG. 4, as a hidden responder, in a TXOP (namely, a CBAP) or an SP of an initiator STA1 and used for SLS training, a STA4 completes only an ISS (including a TXSS or an RXSS of the initiator) of the STA1, but neither performs RSS (including a TXSS or an RXSS of the responder) of any hidden responder, nor sends sector sweep feedback information, for example, best sector information or SNR information of the ISS, to the initiator STA. In FIG. 4, solid beams represent transmission of an SSW frame or a short SSW frame or a beamforming training sequence, whereas hollow beams represent reception of an SSW frame or a short SSW frame or a beamforming training sequence.

Second phase SLS: The original hidden responder STA serves as an initiator, and the original initiator STA or responder STA serves as a responder, to perform ISS training and/or RSS training. The RSS training usually includes only an RXSS of the responder.

Figure 5:
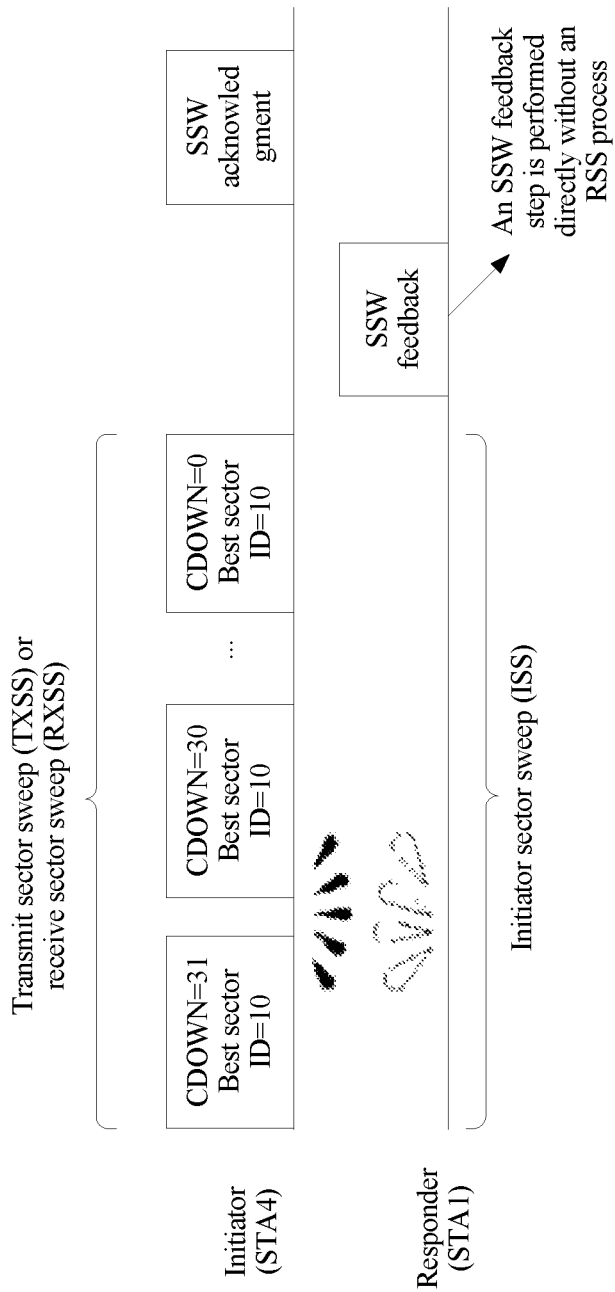
FIG. 5 is a flowchart in which a hidden device participates in beamforming training as an initiator.

As shown in FIG. 5, the STA4 completes, as an initiator STA, the RSS that is not yet completed in the first phase SLS. In addition, because the STA1, as an initiator, has completed the TXSS or the RXSS of the ISS in the first phase SLS, the STA1 does not need to perform the TXSS or the RXSS of the RSS as a responder in the second phase SLS, but may complete, as a responder, a TXSS or an RXSS that is not yet performed in the first phase SLS. For example, because the STA1 has completed the TXSS of the ISS, but does not complete the RXSS of the ISS as an initiator in the first phase, the STA1 does not need to perform the TXSS as a responder in the second phase SLS, but the STA1 may perform the RXSS of the RSS as a responder in the second phase SLS.

The hidden STA4 does not send a beamforming training feedback message (for example, an SSW-Feedback frame) in the first phase SLS. Generally, the first phase SLS and the second phase SLS belong to two different transmission resources, that is, belong to two different TXOPs or SPs. However, in the other approaches, a complete SLS should be completed in one TXOP or SP. In the present disclosure, a time interval between an end of the first phase SLS and a start of the second phase SLS is greater than a medium beamforming interframe space MBIFS between an ISS, an RSS, SSW-Feedback, and SSW-Ack in the other approaches. Before the hidden STA initiates the second phase SLS as an initiator, it should be determined, based on estimated duration of the second phase SLS, that the best sector information is still valid when the second phase SLS ends. To be specific, the STA4 determines that from obtaining of sector selection information of the STA1 to the end of the ISS initiated by the STA4, the sector selection information is within a preset beam link maintenance time. For example, when the best sector information is determined, a beam link maintenance timer is started. It is assumed that a time interval between the end of the first phase SLS and an end of the second phase SLS is L (displayed by the foregoing timer), and the hidden STA presets maximum duration K of a beam link valid state. The hidden STA should ensure that L is less than or equal to K before the start of the second phase SLS.

The following describes the beamforming training in this application in detail with reference to specific embodiments.

Embodiment 2

In Embodiment 2 of the present disclosure, an SLS phase includes the following steps.

Step 1: A STA4 obtains a beamforming training time of a beamforming training group.

For example, the STA4 obtains, using a scheduling message sent by an AP/PCP, for example, using an extended schedule element and/or an enhanced directional multi-gigabit (DMG) (EDMG) extended schedule element, or using a received grant frame/grant acknowledgment (Grant Ack) frame, a start time and duration of a CBAP/SP used for SLS training, a channel included in the CBAP/SP, and a beamforming training transmission mode, and identifies a target STA (for example, a STA1) in a training group participating in the SLS. For example, a start time and duration of the SLS may be obtained using an allocation field in the extended schedule element and/or the EDMG extended schedule element or a dynamic allocation information (Dynamic Allocation Info) field of the grant/grant Ack frame, and control information of the SLS is obtained using a beamforming control (BF Control) field.

Step 2: As shown in FIG. 4, as a hidden responder, the STA4 receives an SSW frame or a short SSW frame in an ISS phase or an RSS phase of the target STA (for brief description, in the present disclosure, the SSW frame is used to collectively represent the SSW frame or the short SSW frame), and completes TXSS training or RXSS training of the STA1.

The target STA may be an initiator STA or a responder STA in the beamforming training group, and an ISS or an RSS of the target STA may perform TXSS or RXSS training. The hidden responder is a STA that fails to send an SLS training request to the target STA, the AP, or the PCP and is not scheduled by the AP/PCP but still wants to perform SLS training, namely, a STA whose address does not match a receive address of any SSW frame or short SSW frame in the SLS.

The hidden responder serves as a receiver of the SSW frame or the short SSW frame in the ISS/RSS of the target STA, but neither serves as a responder to perform RSS training, nor feeds back, to the initiator STA in a first phase SLS, best sector information or SNR information determined based on the received SSW frame or short SSW frame. It should be noted that each STA in a beamforming training group may serve as a receiver of an SSW frame or a short SSW frame sent by a STA. To be specific, when an address of any STA does not match a receive address (also referred to as RA) of the SSW frame or the short SSW frame, a receive address field of the SSW frame or short SSW frame may be ignored.

For example, if the RA field of the SSW frame or the short SSW frame indicates an individual address or a group address, any STA whose address does not match the RA address may perform the first phase SLS training as a receiver of the SSW frame or the short SSW frame.

Figure 6:
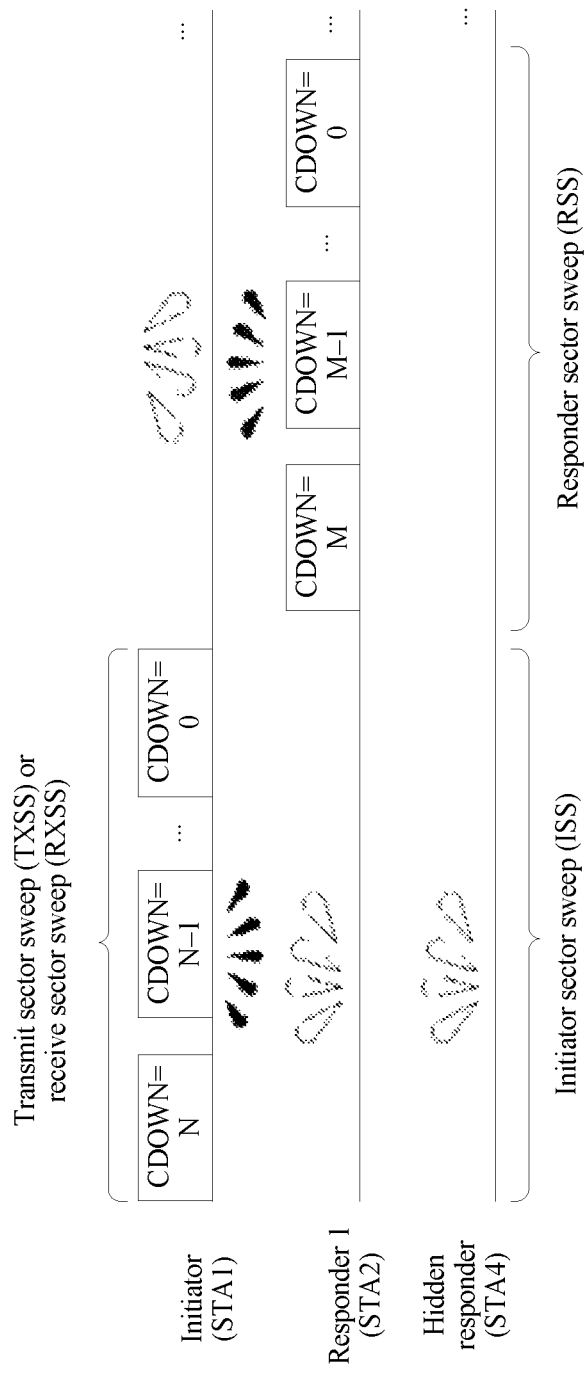
FIG. 6 is a flowchart in which a hidden device uses an initiator in a beamforming training group as a target station (STA) to participate in beamforming training.

As shown in FIG. 6, the STA4 selects the initiator STA1 as the target STA for SLS training, and performs the TXSS or RXSS training initiated by the STA1.

Figure 7:
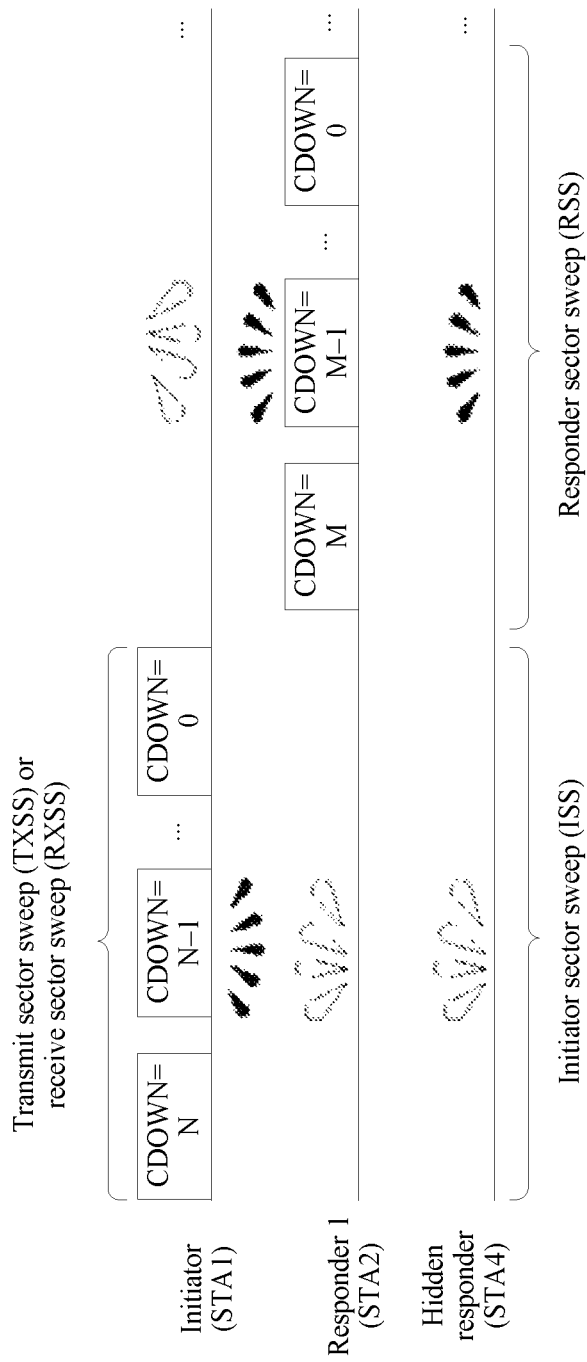
FIG. 7 is a flowchart in which a hidden device uses an initiator and a responder in a beamforming training group as target STAs to participate in beamforming training.

As shown in FIG. 7, the STA4 selects both the initiator STA1 and a responder STA2 as target STAs for SLS training. In the ISS and RSS phases, the STA4 serves as a hidden responder outside an SLS training group, and receives, through sweeping, an SSW frame or a short SSW frame sent by the STA1 and the STA2 in order to complete partial SLS training of the STA1 and the STA2 in the first phase.

Step 3: As shown in FIG. 5, the STA4 (the original hidden responder) re-obtains a new channel time resource (SP/TXOP) as an initiator to complete second phase SLS training with the STA1 (the original initiator). The second phase SLS is a continuation of the first phase SLS training, and the second phase SLS may have only an ISS but have no RSS.

Step 4: In a TXSS of the second phase SLS (the new SP/TXOP), an SSW frame or a short SSW frame sent by the STA4 includes best sector information of the STA2 in the first phase SLS (a previous TXSS), for example, one or more sector select ID (namely, a best sector ID) fields, and an antenna/radio frequency chain ID corresponding to each best sector. As a new responder, the STA1 determines, based on a received value of the best sector ID field, to directly send an SSW-Feedback frame without performing a responder TXSS.

Figure 8:
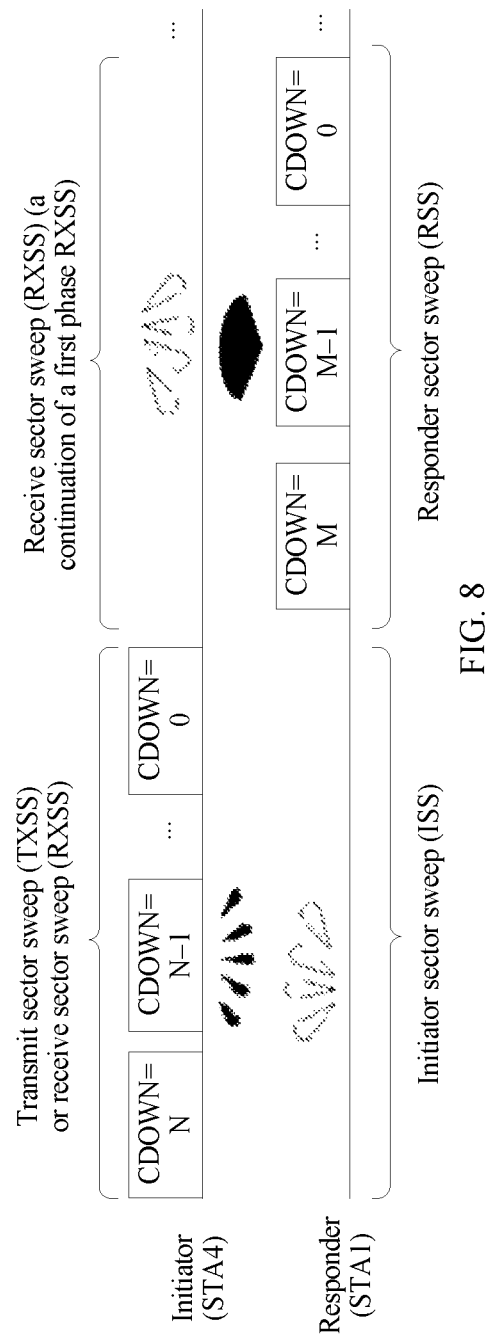
FIG. 8 is another flowchart in which a hidden device participates in beamforming training as an initiator.

If the STA1 performs an RXSS in the ISS in the first phase SLS, the STA1 sends the SSW frame or the short SSW frame in a quasi-omni antenna mode or an antenna mode of a best transmit sector for the responder STA2. When the STA1 uses the quasi-omni antenna mode in the RXSS, a problem existing when the STA4 performs RXSS training that a quantity of SSW frames or short SSW frames sent by the STA1 for the responder STA2 cannot meet a requirement of the STA4 to perform the RXSS, that is, a quantity of SSW frames or short SSW frames sent by the STA1 is less than a quantity of receive sectors that the STA4 needs to sweep. When the STA4 finds, using a countdown (CDOWN) field of the SSW frame or the short SSW frame (as shown in FIG. 6, an initial value of the CDOWN field is N), that the total quantity of SSW frames or short SSW frames is less than the quantity of receive sectors that the STA4 needs to sweep, as shown in FIG. 8, when performing subsequent SLS training, the STA4 may send a request message that includes RXSS length information to the STA1 in order to request the STA1 to continue to perform the RXSS in the second phase SLS based on the RXSS length information, and complete unfinished sweeping of remaining receive sectors. For example, the STA4 has 64 receive sectors, and the STA1 sends only 32 SSW frames or short SSW frames for an RXSS of the STA2. In the first phase SLS training process shown in FIG. 6, the STA4 can sweep only 32 receive sectors/receive beams. As shown in FIG. 8, remaining 32 receive sectors may be swept in the RXSS of the STA1 in the second phase SLS.

In a beamforming training process shown in FIG. 5, that the STA1 does not perform RSS training may be explicitly indicated by the STA4 by sending a message. For example, a reserved field of an SSW frame/short SSW frame/grant frame/SP request frame/BRP frame indicates a "no RSS (NoRSS) field" in order to indicate the STA1 not to perform the RSS as a responder. The NoRSS may further include "no responder TXSS" or "no responder RXSS" to respectively indicate the STA1 not to perform a responder TXSS or a responder RXSS as a responder. The NoRSS field may be included in a beamforming control field or an EDMG beamforming control field of the SSW frame/short SSW frame/grant frame/SP request frame/BRP frame, or may be included in a control trailer of the foregoing frame. In addition, the AP or the PCP may include, in a DMG beacon frame or an announce frame, the received NoRSS field that is included by the initiator STA in beamforming training request information, and sends the NoRSS field to a responder.

Alternatively, that the STA1 does not perform RSS training may be implicitly indicated by the STA4 using another message. For example, as shown in FIG. 5, each SSW frame or short SSW frame that is sent by the STA4 in a TXSS of the ISS phase in the second phase SLS includes a value of a sector select/best sector ID field and a corresponding antenna/radio frequency chain ID. This indicates that the STA4 has obtained a best transmit sector ID of the STA1 through SLS training in the first phase. Therefore, the STA1 does not need to perform a TXSS of the RSS, but directly sends the SSW-Feedback frame or the SSW Ack frame to respond to the ISS of the STA4, and the STA4 sends an SSW Ack frame or an SSW-Feedback frame as a response. In addition, the best sector ID and the corresponding antenna/radio frequency chain ID may further be included in the grant frame, and the STA4 sends the grant frame to the STA1. The STA1 does not need to perform the TXSS of the RSS.

Similarly, that the STA1 does not perform the responder RXSS training may also be implicitly indicated by the STA4 using other messages. For example, when the STA4 completes the RXSS of the STA1 in the first phase SLS, the STA4 may include, in the SSW/short SSW frame of the second phase, a value that is indicated by an SNR report subfield of a transmit sector of the STA1 and that is obtained during the RXSS to indicate the STA1 not to perform the responder RXSS.

The method in this embodiment may be applied not only to beamforming training in the SLS phase, but also to RXSS training in a MID subphase in a BRP phase. For example, a STA (for example, the STA4) serves as a hidden STA to participate in an RXSS training process of the STA1 in the MID subphase of the BRP phase of another pair of STAs (for example, the initiator STA1 and the responder STA2) in order to obtain a best receive sector of the STA. When the STA4 subsequently performs SLS phase training with the STA1, the RXSS of the STA1 does not need to be further performed such that a training time of the RXSS of the STA1 is reduced. It should be noted that, when the hidden STA participates in the RXSS in the MID subphase of the BRP phase of the other pair of STAs, related information such as a start time and duration of the RXSS may be obtained using a beamforming control field carried by various management frames such as a DMG beacon frame or a grant frame, or may be obtained using a field (for example, a beamforming control field or a DMG BRP element) of each type of frame (for example, an SSW feedback/Ack frame or a BRP frame) negotiated for establishing the BRP phase.

Embodiment 3

Figure 9:
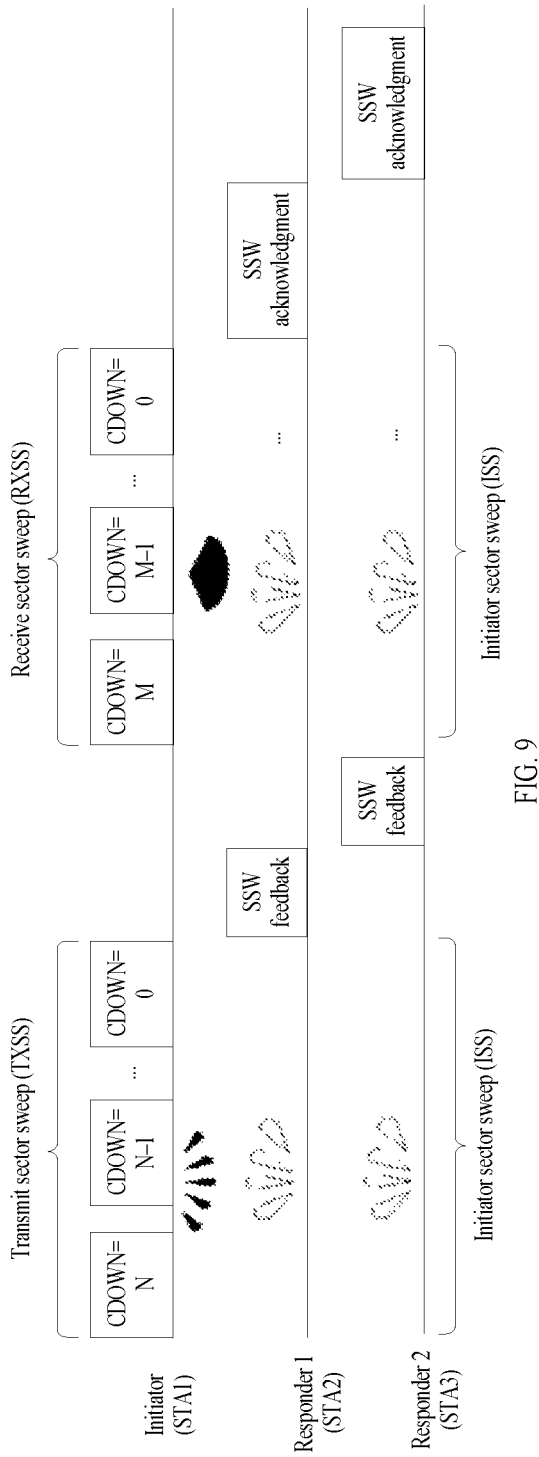
FIG. 9 is a flowchart of a beamforming training method according to Embodiment 3 of the present disclosure.

FIG. 9 is a flowchart of a beamforming training method according to Embodiment 3 of the present disclosure. As shown in FIG. 9, for SLS training of downlink MU-MIMO, a best transmit beam of a data sending STA (STA1) needs to be obtained through a TXSS of an ISS, and a best receive beam of each user equipment needs to be obtained through an RXSS of the ISS. To be specific, in an SLS phase, only two ISS phases (a TXSS of the STA1 and an RXSS of the STA1) of the initiator STA (STA1) are required, and an RSS is not required. This also indicates that in the downlink MU-MIMO, an original SLS protocol that supports a bidirectional link cannot fully support a training process of a unidirectional link in the downlink MU-MIMO. Therefore, an SLS beamforming training protocol in which an ISS and an RSS are separately performed is required to fully support beamforming training using an SLS downlink (unidirectional link).

In the present disclosure, beamforming training is intended to determine information about the best transmit beam and/or the best receive beam, and the information about the best transmit beam and the best receive beam may be respectively represented by a best transmit sector ID and a best receive sector ID, and may further be respectively represented by IDs/sequence numbers of a best transmit antenna weight vector (AWV) and a best receive AWV. In addition, a sector may be represented by a beam or AWV instead.

Improvements of the solution in this embodiment of the present disclosure relative to the other approaches are as follows.

Decoupling between an ISS and an RSS: A reserved field of a beamforming control field is used. For example, a NoRSS field is used to indicate whether an RSS in a second phase SLS occurs. When indicating that there is no RSS in the second phase SLS, the NoRSS field indicates a responder to directly send an SSW-Feedback frame or an SSW-Ack frame after an ISS ends. For another example, a first bit and a second bit of the NoRSS field respectively indicate "no responder TXSS" and "no responder RXSS" in order to respectively indicate enabling and disabling of a responder TXSS and a responder RXSS. Alternatively, a feedback of a sector select/best sector ID field is directly included in an SSW frame or a short SSW frame in an ISS phase of the second phase SLS in order to indicate enabling and disabling of the RSS.

Modifying an existing SLS protocol: A TXSS at the beginning of the ISS is enabled to carry the best sector ID, the responder STA is enabled to use the SSW-Feedback frame originally used by an initiator only, and the initiator is enabled to use the SSW Ack frame. In addition, the RXSS may be split into two phases, which are respectively performed in a first phase SLS and the second phase SLS. RXSS length information in the second phase SLS is used to indicate a quantity of remaining receive sectors/receive AWVs that are not swept in the first phase SLS.

Modifying a meaning of an address field of an SSW frame or a short SSW frame. For example, if an RA field is a broadcast/group address, it indicates that another STA, as a hidden STA, may perform phased SLS proposed in the present disclosure with the other STA, and a new phased SLS completion time limit indication is added to indicate valid duration of a beamforming training result obtained in the first phase SLS.

Beneficial effects that can be achieved in the solution in this embodiment of the present disclosure are as follows.

After the ISS and the RSS of the SLS are separated, a potential STA that needs to perform the SLS can flexibly participate in any TXSS/RXSS in an ISS or an RSS in the first phase SLS in real time, and in the subsequent second phase SLS, a previously completed SLS phase is omitted in order to reduce required total duration of the TXSS/RXSS.

Figure 10:
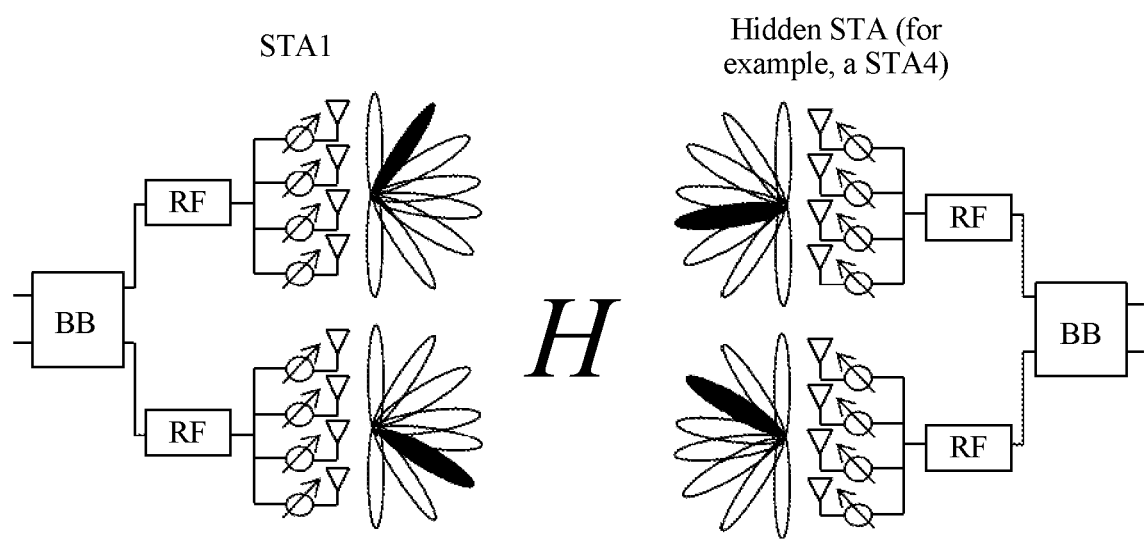
FIG. 10 is a schematic diagram of antenna sectors of a STA and a hidden device.

When a TXSS of a STA takes a long time, for example, in FIG. 10, when a STA1 has two large-scale phased-array antennas of 64 elements, and each antenna has 128 transmit sectors, 256 SSW frames in total need to be sent to complete a TXSS once. If a hidden STA wants to perform SLS training with the STA1, the hidden STA may directly participate in a TXSS performed between the STA1 and another STA. In this way, the STA1 is prevented from performing a TXSS again with the hidden STA, and reduced TXSS duration reaches 4.07 milliseconds (ms) (15.91 microseconds (μs)× 256). Therefore, SLS duration can be significantly reduced. In the foregoing example, there are only 128 transmit sectors of one antenna of the STA1. When there are 1024 transmit sectors of one antenna of the STA1, reduced TXSS duration can reach 32.56 ms.

According to this embodiment, normal beamforming training of an existing SLS training group is not interfered, and there is no problem that scheduling or polling needs to be performed for a multi-user response in MU-MIMO beamforming training. The hidden STA receives only a sent SSW frame/TRN training sequence, and does not send an SSW frame or feedback a beamforming training result. However, when beamforming training of a transmit link needs to be performed, the hidden STA performs beamforming training with a target STA as an initiator STA.

The present disclosure is particularly suitable for a scenario in which one device performs beamforming training with a plurality of devices at the same time. For example, in relay application, a relay device needs to maintain two links with a source device and a destination device. Therefore, during SLS training, even if the source device or the destination device cannot send a beamforming training request to the relay device, the source device or the destination device may participate in beamforming training of the relay device in real time, thereby reducing beamforming training time. In addition, in MU-MIMO, the present disclosure is also particularly suitable for a hidden device to participate in beamforming training in real time, and beamforming training that needs to be applied to a unidirectional link (only a transmit beam of a device and a receive beam of a peer device are trained).

Embodiment 4

In an existing beamforming training method, when requesting a channel resource, a beamforming training initiator does not differentiate channel characteristics. However, in an actual beamforming training process, a beam channel with a specific characteristic may need to be trained. It can be learned that an existing beamforming training channel allocation manner does not meet a training requirement of the channel with the specific characteristic. To resolve this technical problem, this embodiment of the present disclosure provides a beamforming training method. In the method, when requesting or negotiating a beamforming training resource, a beamforming training initiator includes one or more types of training phase information, channel number information, channel bandwidth information, channel transmission mode information, and information about a quantity of spatial flows of a training sequence in beamforming training request information in order to request a second device to allocate or negotiate to determine a channel that has a characteristic specified in the request information for beamforming training.

It should be noted that, the beamforming training initiator in the solution in this embodiment of the present disclosure may be the beamforming training initiator in the beamforming training group shown in FIG. 2, or may be the hidden device (for example, the STA4) outside the beamforming training group shown in FIG. 3.

Figure 11:
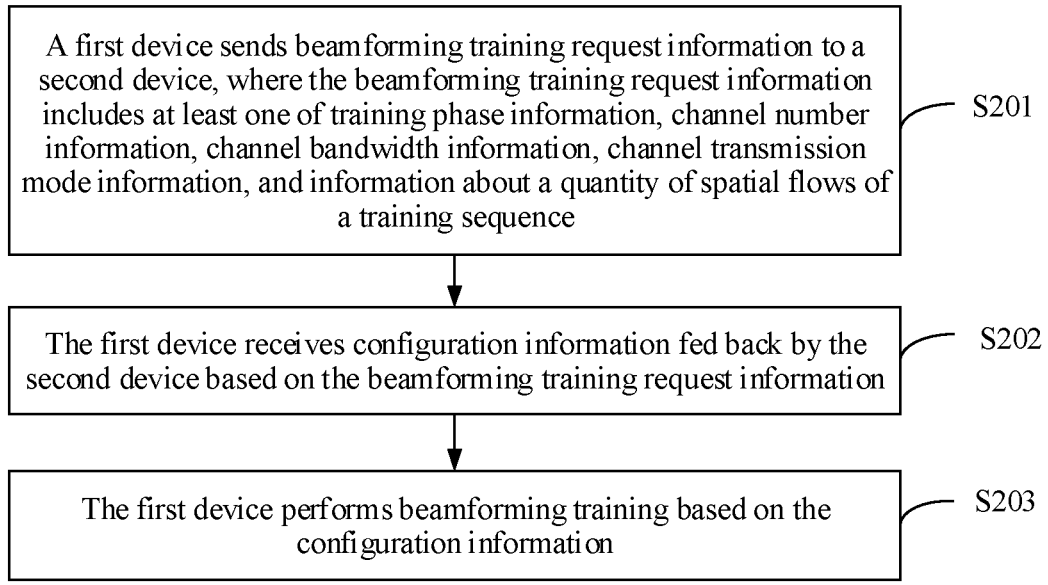
FIG. 11 is a flowchart of a beamforming training method according to Embodiment 4 of the present disclosure.

FIG. 11 is a flowchart of a beamforming training method according to Embodiment 4 of the present disclosure. As shown in FIG. 11, the method includes the following steps.

Step S201: A first device sends beamforming training request information to a second device, where the beamforming training request information includes at least one of training phase information, channel number information, channel bandwidth information, channel transmission mode information, and information about a quantity of spatial flows of a training sequence.

Step S202: The first device receives configuration information fed back by the second device based on the beamforming training request information.

Step S203: The first device performs beamforming training based on the configuration information.

In the implementation solution in this embodiment of the present disclosure, when requesting or negotiating a beamforming training resource, a beamforming training initiator (corresponding to the first device) includes one or more of the training phase information, the channel number information, the channel bandwidth information, the channel transmission mode information, and the information about a quantity of spatial flows of a training sequence in the beamforming training request information in order to request the second device to allocate or negotiate to determine a channel that has a characteristic specified in the request information for beamforming training.

In a possible design, the beamforming training request information is included in an SP request frame, a grant frame, or a grant acknowledgment frame.

In a possible design, the training phase information is used to indicate an SLS phase or a BRP phase.

In this implementation, the training phase information in the beamforming training request information indicates the SLS phase or the BRP phase such that the second device allocates a channel resource corresponding to a corresponding training phase.

In a possible design, the channel number information is used to indicate whether a channel with a specified number is requested for beamforming training.

In this implementation, the channel number information is used to indicate whether the channel with the specified number is requested such that the second device allocates the channel with the specified number for beamforming training.

In a possible design, when the channel number information indicates that the channel with the specified number is requested, or when the training phase information indicates the BRP phase, the channel bandwidth information is used to indicate one or more channel numbers, and when the channel number information indicates that the channel with the specified number is not requested, or when the training phase information indicates the SLS phase, the channel bandwidth information is used to indicate a channel bandwidth.

In a possible design, the channel transmission mode information is used to indicate whether a beamforming training sequence uses a channel aggregation mode or a channel bonding mode.

In a possible design, when the training phase information indicates the BRP phase, the information about a quantity of spatial flows of a training sequence is used to indicate a quantity of transmit spatial flows of a training field.

Corresponding to the method in Embodiment 4, this application further provides Embodiment 5.

Embodiment 5

Figure 12:
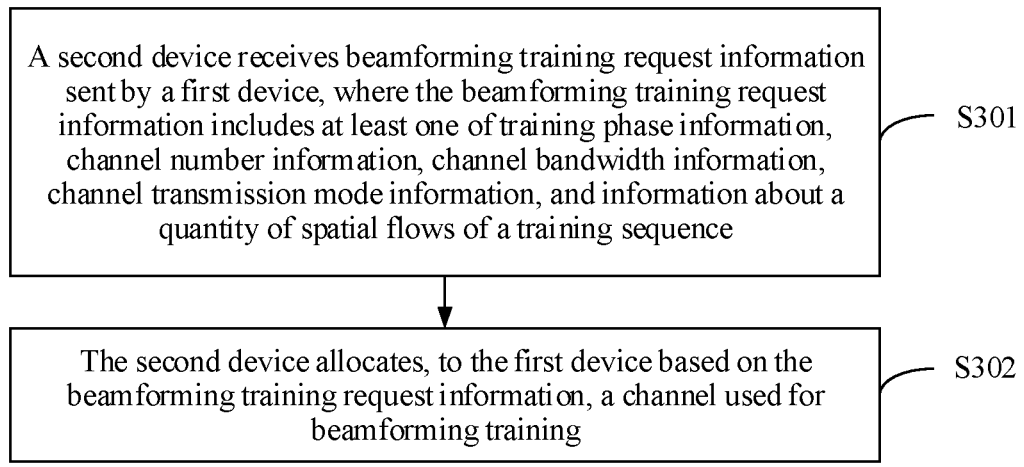
FIG. 12 is a flowchart of a beamforming training method according to Embodiment 5 of the present disclosure.

FIG. 12 is a flowchart of a beamforming training method according to Embodiment 5 of the present disclosure. As shown in FIG. 12, the method includes the following steps.

Step S301: A second device receives beamforming training request information sent by a first device, where the beamforming training request information includes at least one of training phase information, channel number information, channel bandwidth information, channel transmission mode information, and information about a quantity of spatial flows of a training sequence.

Step S302: The second device allocates, to the first device based on the beamforming training request information, a channel used for beamforming training.

In an existing beamforming training method, when requesting a channel resource, a beamforming training initiator does not differentiate channel characteristics. Correspondingly, when allocating a channel at the request of the first device, the second device does not differentiate channel resource characteristics. In the solution in this embodiment of the present disclosure, when requesting or negotiating a beamforming training resource, a beamforming training initiator (corresponding to the first device) includes one or more types of the training phase information, the channel number information, the channel bandwidth information, the channel transmission mode information, and the information about a quantity of spatial flows of a training sequence in the beamforming training request information. Therefore, when allocating a channel resource to the first device or negotiating with the first device to determine a channel resource, the second device allocates a channel resource based on a channel characteristic specified in the beamforming training request information.

In a possible design, the beamforming training request information includes the training phase information and/or the channel number information, and further includes the channel bandwidth information, when the training phase information indicates an SLS phase, and/or the channel number information in the beamforming training request information indicates that a channel with a specified number is not requested, the channel bandwidth information is used to indicate a channel bandwidth, and allocating, by the second device to the first device based on the beamforming training request information, a channel used for beamforming training includes allocating, by the second device to the first device, a channel whose channel bandwidth is less than or equal to the channel bandwidth indicated by the channel bandwidth information.

In a possible design, the beamforming training request information includes the training phase information and/or the channel number information, and further includes the channel bandwidth information, when the training phase information indicates a BRP phase, and/or the channel number information in the beamforming training request information indicates that a channel with a specified number is requested, the channel bandwidth information is used to indicate one or more channel numbers, and allocating, by the second device to the first device based on the beamforming training request information, a channel used for beamforming training includes allocating, by the second device to the first device, at least one channel whose channel number is indicated by the channel bandwidth information.

In a possible design, the beamforming training request information includes the channel bandwidth information, and the channel bandwidth information indicates zero, and the allocating, by the second device to the first device based on the beamforming training request information, a channel used for beamforming training includes allocating, by the second device, any single channel to the first device.

In a possible design, the beamforming training request information includes the channel transmission mode information, and the channel transmission mode information is used to indicate whether a beamforming training sequence uses a channel aggregation mode or a channel bonding mode, and allocating, by the second device to the first device based on the beamforming training request information, a channel used for beamforming training includes allocating, by the second device to the first device, a channel whose channel mode is the same as a channel mode indicated by the channel transmission mode information.

In a possible design, the beamforming training request information includes the information about a quantity of spatial flows of a training sequence and the training phase information, and when the training phase information indicates the BRP phase, the information about a quantity of spatial flows of a training sequence is used to indicate a quantity of transmit spatial flows of a training field, and allocating, by the second device to the first device based on the beamforming training request information, a channel used for beamforming training includes allocating, by the second device to the first device, a channel for BRP training and with a quantity of spatial flows the same as the quantity of spatial flows indicated by the information about a quantity of spatial flows of a training sequence.

The following describes the beamforming training method in this embodiment of the present disclosure in detail with reference to specific instances.

Similar to the 802.11ad standard, beamforming training is divided into two phases, an SLS and a BRP. The SLS phase is intended to establish an initial link between two devices such that a physical layer protocol data unit (PPDU) in a control mode can be transmitted. However, in the BRP phase, based on the initial link established in the SLS phase, training is further performed for a receive beam (RX beam)/receive AWV (RX AWV), and beam combining measurement is performed between a transmit sector/transmit AWV and a receive sector/receive beam/receive AWV in order to better align a transmit beam and a receive beam, and to establish a best link between a receive device and a transmit device.

It can be learned from functional division between the SLS and the BRP that the SLS is intended to quickly establish the initial link to implement exchange of some management control information, while quality of the initial link is usually not the best. In the BRP, beam refinement is further performed based on the existing initial link in order to establish the best link for data transmission. In a millimeter wave band (for example, a 60 GHz band), a best link (regardless of a single-input single-output (SISO) link or a MIMO link) between a receive STA and a transmit STA is frequency-related, namely, channel-related. To be specific, transmit or receive beams/sectors corresponding to best links obtained by performing beamforming training on different channels may be different. Therefore, in addition to some special application scenarios, beamforming training in the SLS phase does not need to be distinguished between specific or particular channels. However, beamforming training in the BRP phase needs to be distinguished between specific or particular channels on which the beamforming training is performed. The special application scenarios mainly include an initiator STA wants to perform parallel training between a plurality of transmit antennas and a plurality of receive antennas using a plurality of channels and a multi-beamforming method in order to accelerate SLS phase training between the initiator STA and one or more responder STAs.

Figure 13:
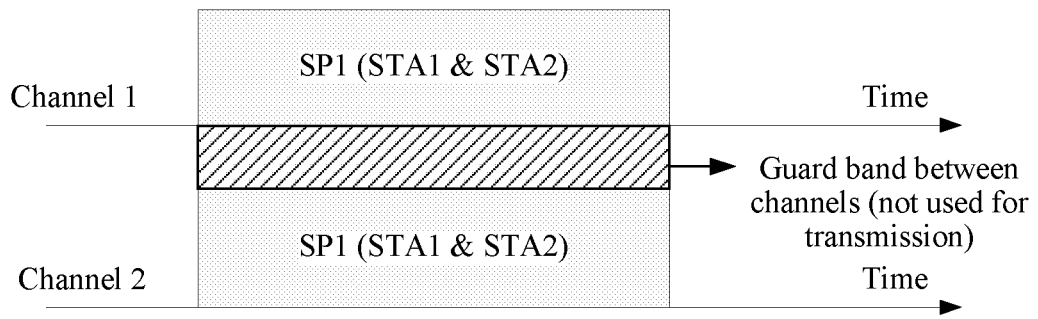
FIG. 13 is a schematic diagram of a channel aggregation transmission mode.
Figure 14:
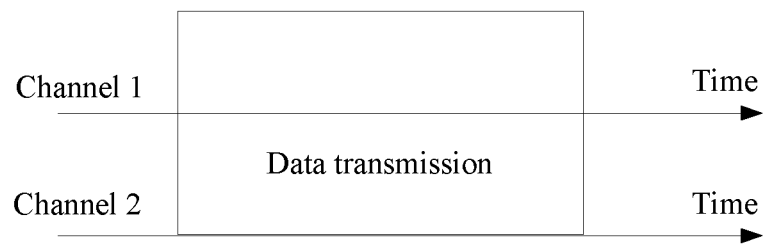
FIG. 14 is a schematic diagram of a channel bonding transmission mode.

A channel mode in beamforming training in the BRP phase means that there is a channel aggregation (also referred to as CA) mode and a channel bonding (also referred to as CB) mode in a draft of the 802.11ay standard. As shown in FIG. 13, channel aggregation means that for a plurality of channels, each channel uses a same transmission mode (for example, each channel uses a DMG physical layer sending method in the 802.11ad standard and uses a center frequency, a transmission bandwidth definition, and the like that are the same as those in the 802.11ad standard), and a guard band between two channels is not used during transmission. As shown in FIG. 14, the channel bonding transmission mode may also be referred to as a wideband (also referred to as WB) mode, and is a mode in which a new center frequency is used during transmission on a plurality of channels, and a guard band between adjacent channels is also used for transmission.

In a case of SISO or MIMO, when an initiator STA requests an AP/PCP to allocate one or more channels for beamforming training, or negotiates a channel for beamforming training with one or more target STAs (responder STAs), indication information needs to be sent. The indication information is used to indicate channel number information for beamforming training or channel bandwidth information for beamforming training.

The indication information needs to be classified into the channel number information and the channel bandwidth information, because a 400 megahertz (MHz) guard band exists between adjacent channels of a 60 GHz band, and different training results may be obtained through beamforming training (in particular, in the BRP phase) in the channel aggregation manner or the channel bonding manner, and different training results are more likely to occur in a case of a relatively large quantity of antennas and a relatively narrow beam. Therefore, for the beamforming training, it needs to be determined, based on a service data sending manner (channel aggregation or channel bonding), whether a beamforming training sequence (for example, an automatic gain control (AGC) and training (TRN) subfield, an SSW frame or a short SSW frame, or a beamforming training sequence based on orthogonal frequency division multiplexing (OFDM) modulation) uses the channel aggregation sending manner.

Based on a difference between requesting an AP/PCP to allocate a channel and directly contending for accessing a channel for beamforming training, the following two cases may be included.

Case 1: An initiator STA requests the AP/PCP to allocate one or more channels for beamforming training in an SLS phase.

When SLS phase training is performed between a pair of receive and transmit STAs (a STA1 and a STA2), for example, when a link has never been established between the STA1 and the STA2 before, or when an originally established link is interrupted due to a reason such as device movement or antenna rotation, the SLS phase beamforming training needs to be performed to re-establish an initial link.

In addition to multi-beamforming training in the SLS phase performed using a plurality of channels, to reduce power consumption, beamforming training in the SLS phase may be performed only on a single channel (for example, a channel with a 2.16 GHz bandwidth). In this case, in beamforming training request information sent by the initiator STA for beamforming training in the SLS phase, only required channel bandwidth information needs to be indicated, and channel number information does not need to be indicated.

Further, the beamforming training request information sent by the initiator STA to the AP/PCP may be included in an SPR frame, a grant frame, or a grant acknowledgment frame, for example, included in a newly defined EDMG beamforming control field, a newly defined EDMG dynamic allocation information field, and/or a beamforming control field. The EDMG beamforming control field and the EDMG dynamic allocation information (newly defined EDMG beamforming) field may be defined in a control trailer of the SP request frame.

Based on different application scenarios, the beamforming training request information carries at least one type of training phase information, channel number information, channel bandwidth information, channel transmission mode information, and information about a quantity of spatial flows of a training sequence. Content that can be carried in the beamforming training request information is shown in Table 1. The training phase information and the channel number information may be interchangeable, and only one piece is retained. Specific content carried in the channel bandwidth information is indicated by the training phase information or the channel number information. The channel transmission mode information is applicable only to a BRP phase.

TABLE 1

| \multicolumn{5}{c}{Content that can be carried in the beamforming training request information} |
|---|---|---|---|---|
| 1. Training phase information | 2. Channel number information | 3. Channel bandwidth information | 4. Channel transmission mode information | 5. Information about a quantity of spatial flows of a training sequence |

The training phase information is used to indicate whether the initiator STA requests beamforming training in an SLS phase or a BRP phase. For example, some bits of a beamforming control field or an EDMG beamforming control field are used to newly define an "SLS training subfield" to carry the training phase information. When the "SLS training subfield" is set to 1, it indicates that the initiator STA requests beamforming training in the SLS phase. When the "SLS training subfield" is set to 0, it indicates that the initiator STA requests beamforming training in the BRP phase.

The channel number information indicates whether a channel with a specified channel number is specified for beamforming training, or that is, indicates whether the AP/PCP allocates a channel based on a requested channel number for beamforming training, or indicates whether a peer STA contends for accessing a channel based on a requested channel number to complete beamforming training. The channel number information is used to indicate whether the channel bandwidth information indicates a channel bandwidth or a channel number.

For example, some bits of a beamforming control field or an EDMG beamforming control field are used to newly define a "specified channel number subfield" to indicate the channel number information. When the "specified channel number subfield" is set to 1, it indicates that the channel bandwidth information carries a channel number, and is used to request the AP/PCP to allocate, based on the channel number, a channel corresponding to the channel number, or request a responder STA to perform beamforming training on a channel corresponding to the channel number. When the "specified channel number subfield" is set to 0, it indicates that the channel bandwidth information carries a channel bandwidth, and is used to request the AP/PCP to allocate, based on the channel bandwidth, any channel whose bandwidth is less than or equal to the bandwidth.

A channel number usually does not need to be specified in the SLS. Therefore, the channel number information may be replaced by the training phase information. Correspondingly, the "specified channel number subfield" may be replaced by the "SLS training subfield". When the "SLS training subfield" is set to 1, it indicates that the channel bandwidth information carries a channel bandwidth, and is used to request the AP/PCP to allocate any channel with a corresponding bandwidth based on the channel bandwidth. When the "SLS training subfield" is set to 0, it indicates that the channel bandwidth information carries a channel number, and is used to request the AP/PCP to allocate, based on the channel number, a channel corresponding to the channel number, or request the responder STA to perform beamforming training on a channel corresponding to the channel number.

The channel bandwidth information indicates a requested channel bandwidth or channel number used for beamforming training. When X (X is a positive integer) channels exist in a basic service set BSS of the AP/PCP, the channel bandwidth information may be an indication form the same as a bandwidth subfield in an EDMG header A field or a legacy header channel bandwidth (also referred to as Channel BW) field. For example, X bits in an EDMG beamforming control field or a beamforming control field are newly defined as an EDMG-BW subfield to carry the channel bandwidth information, and a channel bandwidth or a channel number for beamforming training is indicated in a channel bitmap manner. When the newly defined EDMG-BW subfield is used to indicate the channel number, if one bit of the EDMG-BW subfield is set to 1, it indicates that a corresponding channel is requested for beamforming training. For example, a bit 0 corresponds to a channel 1, a bit 1 corresponds to a channel 2, and so on. There may be a plurality of EDMG-BW subfields, for example, EDMG-BW1, EDMG-BW2, and EDMG-BW3. An advantage of using the plurality of EDMG-BW subfields is that a channel selection range of the AP/PCP is expanded and scheduling flexibility is improved such that the AP/PCP can select one or more channels from all channels indicated by the plurality of EDMG-BW subfields for allocation. Alternatively, the EDMG beamforming control field or the beamforming control field directly indicates a channel number or a channel bandwidth in a numeral indication manner. The channel bandwidth may be represented by a quantity of channels.

When the SLS training subfield is set to 1 and/or the specified channel number subfield is equal to 0, it indicates that the initiator STA does not need to request or specify a specific channel indicated by the channel number, and the EDMG-BW subfield indicates a requested channel bandwidth for beamforming training or a maximum channel bandwidth. In this case, the AP or the PCP may allocate, based on the EDMG-BW subfield, any channel whose bandwidth is less than or equal to the bandwidth indicated by the EDMG-BW subfield. For example, when the EDMG-BW subfield indicates that the requested channel bandwidth for beamforming training or the maximum channel bandwidth is a bandwidth of a single channel 2.16 GHz, and an operating channel of the AP or the PCP includes a channel 1, a channel 2, and a channel 3, the AP or the PCP may allocate any one of the channel 1, the channel 2, and the channel 3 to the initiator STA for beamforming training.

When the SLS training subfield is set to 0, and/or the channel number information is equal to 1, the EDMG-BW subfield indicates a requested channel number for beamforming training.

Because beamforming training occupies at least one channel, when the EDMG-BW subfield indicates channel bandwidth or channel number information, the channel bandwidth/channel number information can be carried only when a value is greater than 0. Therefore, when a value of the channel number subfield is equal to 0, the channel number subfield may also be used to indicate to request a single channel (for example, a primary channel or a secondary channel).

The channel transmission mode information is used to indicate whether a transmission mode used for requested beamforming training is a channel aggregation mode, to be specific, whether a beamforming training sequence (AGC and TRN subfields of a BRP frame) is sent in a channel aggregation mode. A training sequence aggregation (TRN Aggregation) subfield is defined to indicate whether AGC and TRN fields in a PPDU use the channel aggregation mode. Similarly, the training sequence aggregation subfield may be defined like a channel aggregation subfield in the EDMG-Header-A field. To be specific, when the training sequence aggregation subfield is set to 0, it indicates that a training sequence in the requested beamforming training is the channel bonding transmission mode or a single channel transmission mode, and when the training sequence aggregation subfield is set to 1, it indicates that a training sequence in the requested beamforming training is the channel aggregation transmission mode. The channel transmission mode is referred to as a channel mode for short, and includes the channel aggregation mode or the channel bonding mode. Beamforming training in the channel aggregation transmission mode means that a sequence part used for beamforming training, for example, AGC, training, and SSW frame/short SSW frame (the entire PPDU or a preamble field) of a training sequence of a BRP packet uses the channel aggregation transmission mode. Beamforming training in the channel bonding transmission mode means that the sequence part used for beamforming training uses the channel bonding transmission mode.

Figure 15:
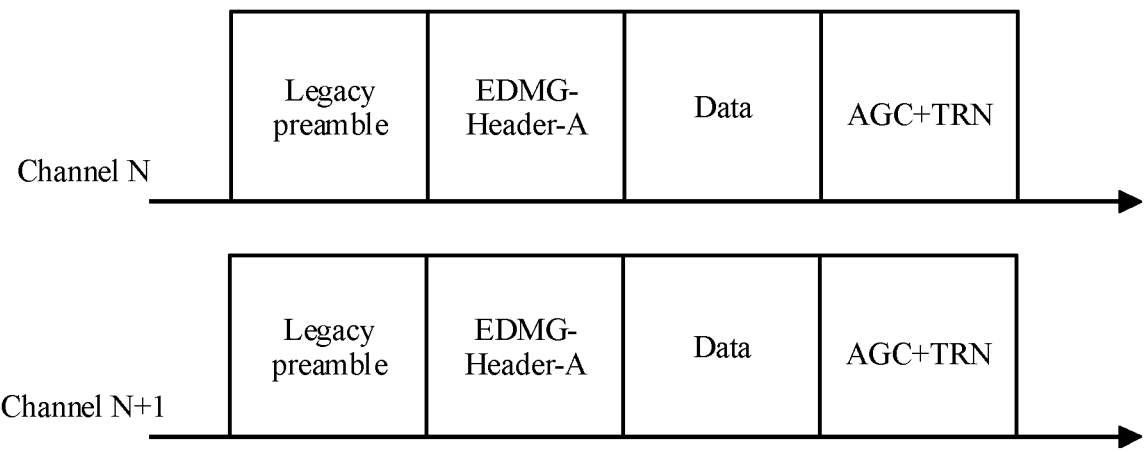
FIG. 15 is a schematic diagram of a channel aggregation transmission mode in a BRP phase.
Figure 16:
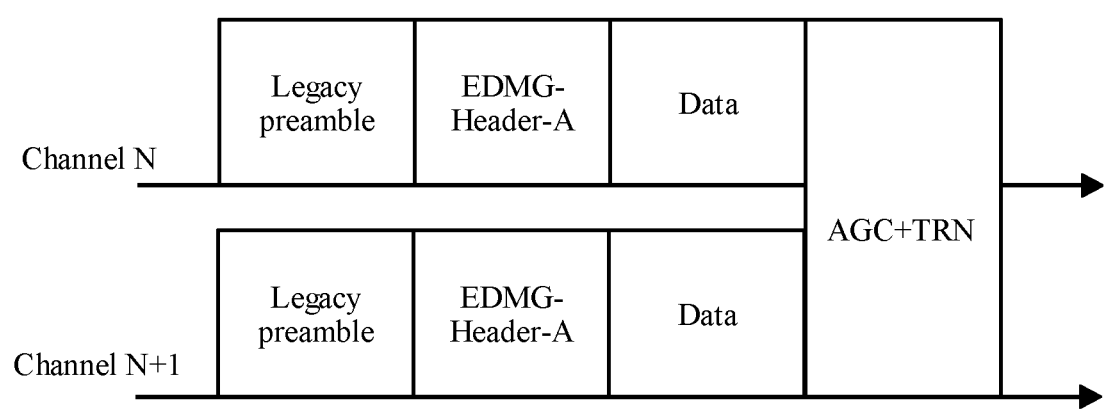
FIG. 16 is a schematic diagram of a channel bonding transmission mode in a BRP phase.

As shown in FIG. 15, the beamforming training in the BRP phase uses the channel aggregation manner, to be specific, the AGC and TRN subfields used as beamforming training sequences all use the channel aggregation transmission mode. As shown in FIG. 16, the beamforming training in the BRP phase uses the channel bonding manner, to be specific, the AGC and TRN subfields used as beamforming training sequences all use the channel bonding transmission mode.

The information about a quantity of spatial flows of a training sequence. When the training phase information indicates the BRP phase, the information about a quantity of spatial flows of a training sequence is used to indicate a quantity of transmit spatial flows of a training field. The training field is a field corresponding to the beamforming training sequence, for example, the AGC and TRN subfields. Otherwise, when the training phase information indicates the SLS phase, the information about a quantity of spatial flows of a training sequence indicates a quantity of transmit spatial flows of an SLS frame. Because a training sequence in MIMO may use a parallel sending MIMO training manner, a receiver of the training sequence needs to implement correct receive antenna configuration based on the information about a quantity of spatial flows of a training sequence such that a time of beamforming training is shortened in a fast MIMO training manner.

The beamforming training sequence is intended to obtain a best antenna configuration for subsequent data transmission through training. Therefore, whether the beamforming training sequence uses the channel aggregation transmission mode depends on which transmission mode, the channel bonding or channel aggregation transmission mode, is used for subsequent data transmission. When the initiator STA/responder STA separately performs beamforming training using a PPDU (for example, a Request to Send (RTS) frame, a Clear to Send (CTS) frame, a grant frame, a decline transmit (DTS) frame, or a grant acknowledgment frame) in a control mode, or a BRP packet (for example, a single carrier mode (SC Mode) PPDU or a low power SC mode PPDU or an OFDM mode PPDU), whether a training field (for example, the AGC and TRN subfields) uses the channel aggregation transmission mode or the channel bonding transmission mode and/or the quantity of transmit spatial flows of a training field need/needs to be indicated. Because in the sending manners shown in FIG. 15 and FIG. 16, sending is usually performed by the RTS frame/CTS frame, the channel transmission mode information and the information about a quantity of spatial flows of a training sequence are further included in the EDMG-Header-A field of the PPDU such that the receiver can quickly obtain the channel transmission mode information and the information about a quantity of spatial flows of a training sequence by decoding and parsing the EDMG-Header-A field, and use corresponding receive antenna configurations and training modes for the AGC and TRN subfields, to properly receive the AGC and TRN subfields of the training sequence in a correct receiving manner. The channel transmission mode information and the information about a quantity of spatial flows of a training sequence may further be included in a control trailer field of the PPDU.

In the solution in this embodiment of the present disclosure, as a receiver of the beamforming training request information, the AP/PCP schedules/allocates, for the initiator STA based on the received beamforming training request information of the initiator STA, a channel used for beamforming training, and includes a specific training parameter configuration of beamforming training in allocation information. The allocation information may be carried in an extended scheduling element and/or an EDMG extended scheduling element.

The training parameter includes at least one of an SLS training subfield, an EDMG-BW subfield, a TRN aggregation subfield, and a training sequence spatial flow quantity subfield. When the SLS training subfield received by the AP/PCP is set to 1, and/or the channel number subfield is specified to be equal to 0, it indicates that the initiator STA does not need to request or specify a specified channel indicated by a channel number, and the EDMG-BW subfield indicates a requested channel bandwidth for beamforming training or a maximum channel bandwidth. In this case, the AP/PCP allocates, based on the requested channel bandwidth for beamforming training or the maximum channel bandwidth indicated by the EDMG-BW subfield, any channel whose bandwidth is less than or equal to the bandwidth indicated by the EDMG-BW subfield within an operating channel range of the BSS, and allocates a channel whose channel type (channel aggregation or channel bonding) is the same as the channel type requested by the initiator, and indicates a quantity of spatial flows of a training sequence the same as a requested quantity of spatial flows of a training sequence.

For example, if training phase information sent by an initiator STA indicates to request to perform beamforming training in the SLS phase, a requested bandwidth is a bandwidth (4.32 GHz) of two channels, TRN aggregation subfield indicates channel bonding, and an operating channel of the AP/PCP includes channels 1 to 3, the AP/PCP may allocate a channel time (on the channel 1 and the channel 2) or a channel time (on the channel 2 and the channel 3) to the initiator STA for beamforming training.

When the SLS training subfield is set to 0, and/or the channel number information is equal to 1, the EDMG-BW subfield indicates a requested channel number for beamforming training. In this case, the AP/PCP allocates, based on a channel number indicated by the EDMG-BW subfield, a channel corresponding to the channel number for beamforming training. The allocation information is included in a DMG beacon frame, an announce frame, or a grant acknowledgment frame.

When the EDMG-BW subfield indicates 0, the AP/PCP allocates any single channel within an operating channel range for beamforming training.

Case 2: An initiator STA directly sends a beamforming training request to a responder STA in a CBAP.

When the initiator STA and the responder STA separately negotiate a beamforming training channel using a grant frame and a Grant Ack frame, a format of beamforming training request information carried in the grant frame is the same as a format of beamforming training request information sent by the initiator STA using an SPR frame, and beamforming training acknowledgment information carried in the Grant Ack frame is used to confirm whether beamforming training can be performed based on a beamforming training parameter indicated by the beamforming training request information.

Figure 17:
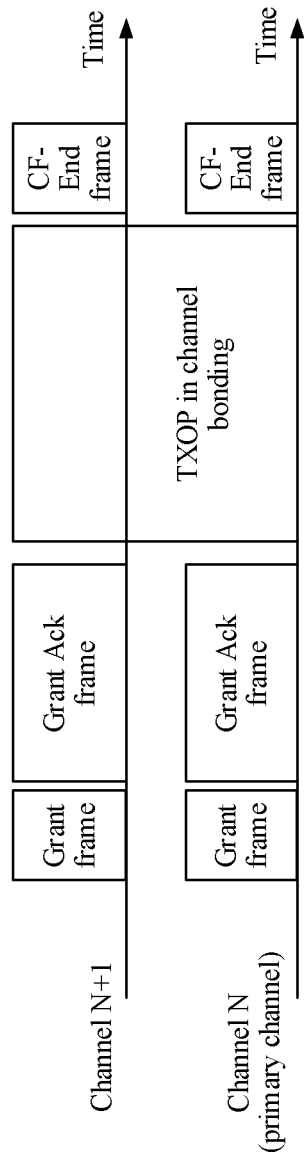
FIG. 17 is a schematic diagram of a channel bonding transmission mode in a contention based access period (CBAP)
Figure 18:
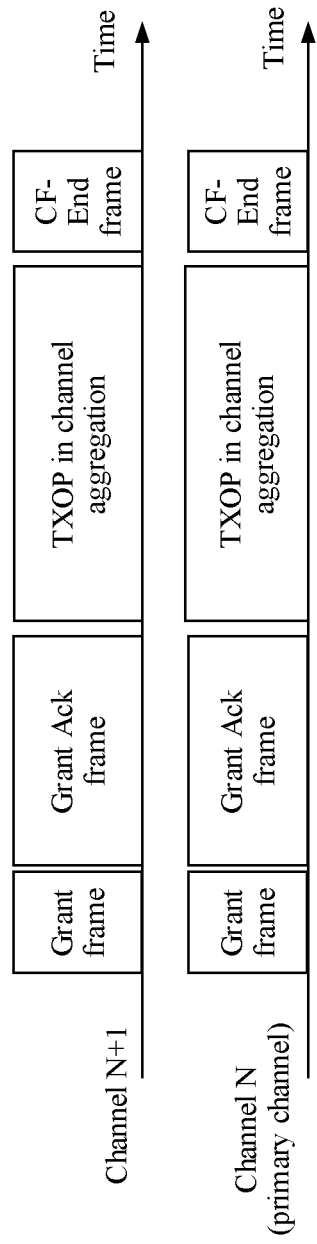
FIG. 18 is a schematic diagram of a channel aggregation transmission mode in a CBAP.

FIG. 17 is a schematic diagram of beamforming training in a channel bonding manner negotiated using a grant frame/grant acknowledgment frame within a CBAP. FIG. 18 is a schematic diagram of beamforming training in a channel aggregation manner negotiated using a grant frame/grant acknowledgment frame in a CBAP. In FIG. 17 and FIG. 18, beamforming training in the channel bonding or channel aggregation manner that uses two channels and is negotiated using the grant frame/grant acknowledgment frame is implemented.

The foregoing method is particularly suitable for the AP/PCP to allocate a proper channel for "point-to-multipoint" MU-MIMO beamforming training or a STA in Embodiment 1. The initiator STA determines, based on a beamforming training phase (SLS/BRP) and/or a beamforming training requirement (whether the SLS phase is MU-MIMO beamforming training or whether the STA in Embodiment 1 has completed partial SLS training), to request one or more channel numbers or only a channel bandwidth from the AP/PCP. Compared with requesting only one channel number, a plurality of channel numbers or only a channel bandwidth requested from the AP/PCP is more likely to be allocated to a required channel resource for beamforming training such that channel resources are used flexibly and efficiently without reducing beamforming training performance.

Embodiment 4 and Embodiment 5 and method instances corresponding to Embodiment 4 and Embodiment 5 of the present disclosure may be applied to a scenario in which an initiator STA in a beamforming training group requests a beamforming training resource from an AP/PCP, or may be applied to a scenario in which a hidden STA requests a beamforming training resource from an AP/PCP, and further may be applied to a scenario in which STAs negotiate a beamforming training resource.

For Embodiment 4, Embodiment 5, and corresponding instances, that the initiator STA determines channel number information based on a beamforming training phase (SLS/BRP) and/or a multi-beamforming manner further includes the following.

a. In a case of non-multi-beamforming, only a single channel needs to be used for beamforming training in the SLS phase.

b. In a multi-beamforming manner, a channel number is required in the SLS phase.

c. In the BRP phase, one or more channel numbers are required.

Further, the channel bandwidth information is used to indicate a channel bandwidth or a channel number. The channel transmission mode information is used to indicate whether a beamforming training sequence or frame is channel aggregation.

Figure 19:
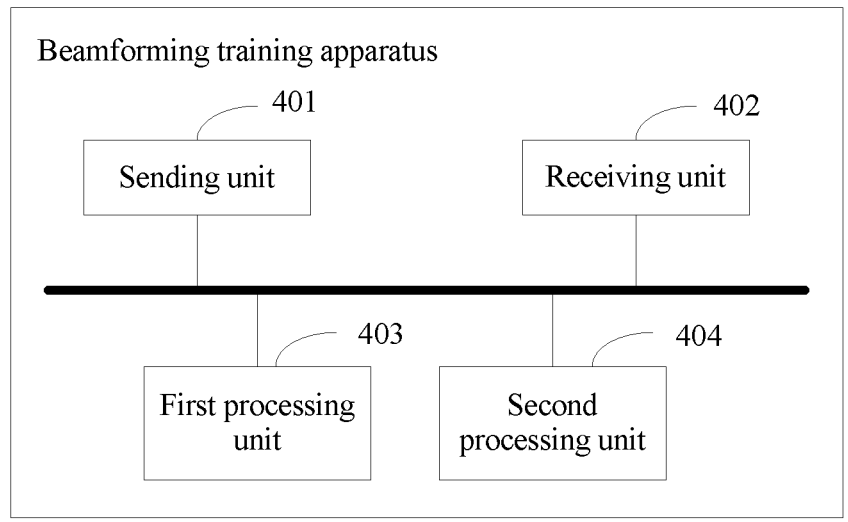
FIG. 19 is a schematic structural diagram of a beamforming training apparatus according to an embodiment of the present disclosure.

FIG. 19 is a schematic structural diagram of a beamforming training apparatus according to an embodiment of the present disclosure. The apparatus shown in FIG. 19 is configured to perform the beamforming training method performed by the first device in Embodiment 1 and the STA4 in the instance corresponding to Embodiment 1, the STA4 in Embodiment 2, and the STA1 in Embodiment 3. The following describes a main function of the beamforming training apparatus. For a part that is not described, refer to Embodiment 1 to Embodiment 3 and the accompanying drawings in Embodiment 1 to Embodiment 3.

The beamforming training apparatus includes a sending unit 401 and a receiving unit 402.

The sending unit 401 is configured to send first indication information to a second device, where the first indication information indicates the second device not to perform an RSS, and send a sector sweep frame of an ISS to the second device. The receiving unit 402 is configured to receive feedback information obtained by the second device during the ISS.

In a possible design, before the sending unit 401 sends the sector sweep frame of the ISS to the second device, the receiving unit 402 is further configured to receive a sector sweep frame of first beamforming training of the second device, where an address of the first device does not match a receive address of the sector sweep frame of the first beamforming training.

The apparatus further includes a first processing unit 403 configured to determine sector selection information or SNR information of the first beamforming training based on the received sector sweep frame of the second device.

In a possible design, the first beamforming training includes an ISS and/or the RSS of the second device.

In a possible design, that the first processing unit 403 determines sector selection information or SNR information of the first beamforming training based on the received sector sweep frame of the second device further includes, when the first beamforming training includes a TXSS of the second device, determining the sector selection information of the second device based on the sector sweep frame of the second device.

In a possible design, that the first processing unit 403 determines sector selection information or SNR information of the first beamforming training based on the received sector sweep frame of the second device further includes, when the first beamforming training includes an RXSS of the second device, determining whether a quantity of sector sweep frames sent by the second device is greater than or equal to a quantity of receive sectors that the first device needs to sweep, and if the quantity of sector sweep frames sent by the second device is greater than or equal to the quantity of receive sectors that the first device needs to sweep, determining SNR information of a transmit sector of the first device based on the received sector sweep frame of the second device.

In a possible design, if the quantity of sector sweep frames sent by the second device is less than the quantity of receive sectors to be swept by the first device, the sending unit 401 is further configured to send second indication information to the second device, where the second indication information is used to indicate RXSS length information of a responder RXSS of the second device after the ISS of the first device.

In a possible design, the first indication information is indication information used to indicate the second device not to perform a responder TXSS and/or a responder RXSS after the ISS of the first device.

In a possible design, the first indication information is included in a sector sweep SSW frame or a short SSW frame of the ISS of the first device, or included in a grant frame or an SP request frame.

In a possible design, the first indication information is the sector selection information or the SNR information.

In a possible design, the apparatus further includes a second processing unit 404 configured to, before the sending unit 401 sends the first indication information, determine that when the ISS of the first device ends, the sector selection information is within a preset beam link maintenance time.

In a possible design, after the receiving unit 402 receives the feedback information obtained by the second device during the ISS, the sending unit 401 is further configured to send a sector sweep frame of second beamforming training to the second device, and the receiving unit 402 is further configured to receive sector selection information or SNR information, based on the second beamforming training, of the second device.

In a possible design, the ISS of the first device is an initiator TXSS, and the second beamforming training is an initiator RXSS, or the ISS of the first device is an initiator RXSS, and the second beamforming training is an initiator TXSS.

In another possible design, the beamforming training apparatus includes a receiver, a transmitter, and a processor. The receiver is configured to implement a function of the receiving unit 402 in FIG. 19, the transmitter is configured to implement a function of the sending unit 401 in FIG. 19, and the processor is configured to implement functions of the first processing unit 403 and the second processing unit 404 in FIG. 19.

Figure 20:
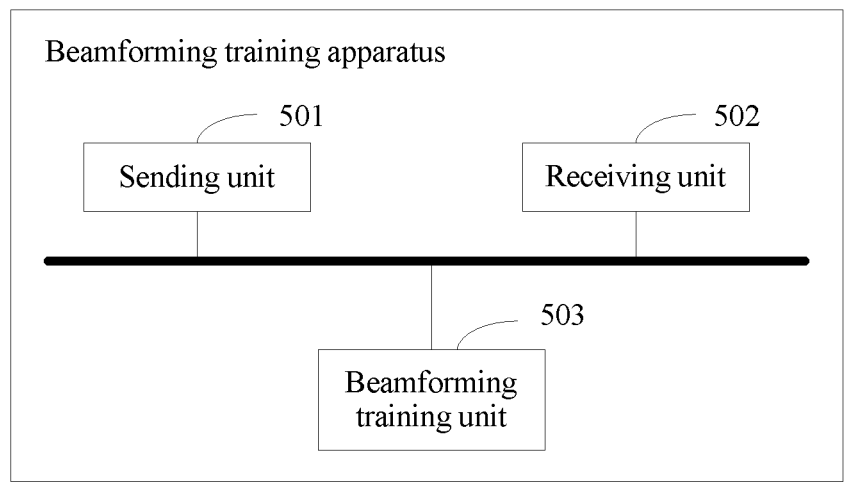
FIG. 20 is a schematic structural diagram of another beamforming training apparatus according to an embodiment of the present disclosure.

FIG. 20 is a schematic structural diagram of another beamforming training apparatus according to an embodiment of the present disclosure. The apparatus shown in FIG. 20 is configured to perform the beamforming training method performed by the first device in Embodiment 4 and the device configured to send the beamforming training request information in the instance corresponding to Embodiment 4. The following describes a main function of the beamforming training apparatus. For a part that is not described, refer to Embodiment 4 and the instance corresponding to Embodiment 4, and the accompanying drawings in Embodiment 4 and the corresponding instance.

The beamforming training apparatus includes a sending unit 501, a receiving unit 502, and a beamforming training unit 503.

The sending unit 501 is configured to send beamforming training request information to a second device, where the beamforming training request information includes at least one type of the following information training phase information, channel number information, channel bandwidth information, channel transmission mode information, and information about a quantity of spatial flows of a training sequence.

The receiving unit 502 is configured to receive configuration information fed back by the second device based on the beamforming training request information.

The beamforming training unit 503 is configured to perform beamforming training based on the configuration information.

In a possible design, the beamforming training request information is included in an SP request frame, a grant frame, or a grant acknowledgment frame.

In a possible design, the training phase information is used to indicate an SLS phase or a BRP phase.

In a possible design, the channel number information is used to indicate whether a channel with a specified number is requested for beamforming training.

In a possible design, when the channel number information indicates that the channel with the specified number is requested, or when the training phase information indicates the BRP phase, the channel bandwidth information is used to indicate one or more channel numbers, and when the channel number information indicates that the channel with the specified number is not requested, or when the training phase information indicates the SLS phase, the channel bandwidth information is used to indicate a channel bandwidth.

In a possible design, the channel transmission mode information is used to indicate whether a beamforming training sequence uses a channel aggregation mode or a channel bonding mode.

In a possible design, when the training phase information indicates the BRP phase, the information about a quantity of spatial flows of a training sequence is used to indicate a quantity of transmit spatial flows of a training field.

In another possible design, the beamforming training apparatus includes a receiver, a transmitter, and a processor. The receiver is configured to implement a function of the receiving unit 502 in FIG. 20, the transmitter is configured to implement a function of the sending unit 501 in FIG. 20, and the processor is configured to implement a function of the beamforming training unit 503 in FIG. 20.

Figure 21:
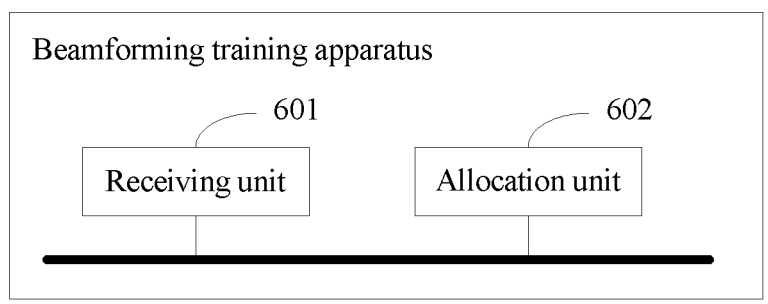
FIG. 21 is a schematic structural diagram of yet another beamforming training apparatus according to an embodiment of the present disclosure.

FIG. 21 is a schematic structural diagram of yet another beamforming training apparatus according to an embodiment of the present disclosure. The apparatus shown in FIG. 21 is configured to perform the beamforming training method performed by the second device in Embodiment 5 and the device configured to receive the beamforming training request information in the instance corresponding to Embodiment 5. The following describes a main function of the beamforming training apparatus. For a part that is not described, refer to Embodiment 5 and the instance corresponding to Embodiment 5, and the accompanying drawings in Embodiment 5 and the corresponding instance.

The beamforming training apparatus includes a receiving unit 601 and an allocation unit 602.

The receiving unit 601 is configured to receive beamforming training request information sent by a first device, where the beamforming training request information includes at least one type of training phase information, channel number information, channel bandwidth information, channel transmission mode information, and information about a quantity of spatial flows of a training sequence.

The allocation unit 602 is configured to allocate, to the first device based on the beamforming training request information, a channel used for beamforming training.

In a possible design, the beamforming training request information includes the training phase information and/or the channel number information, and further includes the channel bandwidth information, when the training phase information indicates an SLS phase, and/or the channel number information in the beamforming training request information indicates that a channel with a specified number is not requested, the channel bandwidth information is used to indicate a channel bandwidth, and that the allocation unit 602 allocates, to the first device based on the beamforming training request information, a channel used for beamforming training includes allocating, to the first device, a channel whose channel bandwidth is less than or equal to the channel bandwidth indicated by the channel bandwidth information.

In a possible design, the beamforming training request information includes the training phase information and/or the channel number information, and further includes the channel bandwidth information, when the training phase information indicates a BRP phase, and/or the channel number information in the beamforming training request information indicates that a channel with a specified number is requested, the channel bandwidth information is used to indicate one or more channel numbers, and that the allocation unit 602 allocates, to the first device based on the beamforming training request information, a channel used for beamforming training further includes allocating, to the first device, at least one channel whose channel number is indicated by the channel bandwidth information.

In a possible design, the beamforming training request information includes the channel bandwidth information, and the channel bandwidth information indicates zero, and the allocating, by the second device to the first device based on the beamforming training request information, a channel used for beamforming training includes allocating, by the second device, any single channel to the first device.

In a possible design, the beamforming training request information includes the channel transmission mode information, and the channel transmission mode information is used to indicate whether a beamforming training sequence uses a channel aggregation mode or a channel bonding mode, and that the allocation unit 602 allocates, to the first device based on the beamforming training request information, a channel used for beamforming training includes allocating, to the first device, a channel whose channel mode is the same as a channel mode indicated by the channel transmission mode information.

In a possible design, the beamforming training request information includes the information about a quantity of spatial flows of a training sequence and the training phase information, and when the training phase information indicates the BRP phase, the information about a quantity of spatial flows of a training sequence is used to indicate a quantity of transmit spatial flows of a training field, and that the allocation unit 602 allocates, to the first device based on the beamforming training request information, a channel used for beamforming training includes allocating, to the first device, a channel for BRP training and with a quantity of spatial flows the same as the quantity of spatial flows indicated by the information about a quantity of spatial flows of a training sequence.

In another possible design, the beamforming training apparatus includes a receiver, a transmitter, and a processor. The receiver is configured to implement a function of the receiving unit 601 in FIG. 21, the transmitter is configured to implement a function of the sending unit in FIG. 20, and the processor is configured to implement a function of the allocation unit 602 in FIG. 21.

It may be understood that, the processor mentioned in the embodiments of the present disclosure may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits that are described with reference to the content disclosed in the present disclosure. The processor may also be a combination of computing functions, for example, a combination of one or more microprocessors or a combination of a DSP and a microprocessor.

A person skilled in the art may clearly understand that, descriptions of the embodiments provided in the present disclosure may be mutually referenced. For ease and brevity of description, for example, for functions of the apparatuses and devices and performed steps that are provided in the embodiments of the present disclosure, refer to related descriptions in the method embodiments of the present disclosure.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable ROM (EPROM), an electrically EPROM (EEPROM), a register, a hard disk, a removable hard disk, a compact disc ROM (CD-ROM), or a storage medium in any other forms well-known in the art. A storage medium used as an example is coupled to the processor such that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

It should be understood that, in several embodiments provided in this application, the disclosed system, device, and method may be implemented in other manners without departing from the scope of this application. For example, the described embodiment is only an example. For example, the module or unit division is only logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

In addition, the schematic diagrams illustrating the system, device, method and different embodiments may be combined or integrated with other systems, modules, technologies or methods without departing from the scope of this application. In addition, the displayed or discussed mutual couplings or direct couplings or communication connections may be implemented using some interfaces. The indirect couplings or communication connections between the apparatuses or units may be implemented in electrical, mechanical, or other forms.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method implemented by a first device, the method comprising:
    sending, to a second device, first indication information, wherein the first indication information is configured to instruct the second device to not perform a first responder sector sweep (RSS);
    receiving, from the second device, a first sector sweep frame of first beamforming training, wherein an address of the first device does not match a receive address of the first sector sweep frame;
    sending, to the second device after receiving the first sector sweep frame, a second sector sweep frame of a first initiator sector sweep (ISS); and
    receiving, from the second device in response to the second sector sweep frame, feedback information.

2. The method of claim 1, wherein before sending the second sector sweep frame, the method further comprises determining, based on the first sector sweep frame, sector selection information or signal-to-noise ratio (SNR) information.

3. The method of claim 2, wherein the first beamforming training comprises a second ISS of the second device, a second RSS of the second device, or the second ISS and the second RSS.

4. The method of claim 2, further comprising determining, based on the first sector sweep frame, the sector selection information when the first beamforming training comprises a transmit sector sweep (TXSS) of the second device.

5. The method of claim 2, further comprising:
    receiving, from the second device, a first quantity of third sector sweep frames;
    determining whether the first quantity is greater than or equal to a second quantity of receive sectors that the first device needs to sweep when the first beamforming training comprises a receive sector sweep (RXSS); and
    determining, based on the first second sector sweep frame, SNR information of a transmit sector of the first device when the first quantity is greater than or equal to the second quantity.

6. The method of claim 5, further comprising sending, to the second device, second indication information when the first quantity is less than the second quantity, wherein the second indication information indicates RXSS length information of a responder RXSS of the second device after the ISS of the first device.

7. The method of claim 2, wherein the first indication information is the sector selection information or the SNR information.

8. The method of claim 2, wherein before sending the first indication information, the method further comprises determining that when the ISS of the first device ends, the sector selection information is within a preset beam link maintenance time.

9. The method of claim 1, wherein the first indication information indicates that the second device is to not perform a responder TXSS, a responder RXSS, or the responder TXSS and the responder RXSS after the ISS of the first device.

10. The method of claim 1, wherein the first indication information is comprised in a sector sweep frame or a short sector sweep frame of the ISS of the first device, or wherein the first indication information is comprised in a grant frame or a service period (SP) request frame.

11. The method of claim 1, wherein after receiving the feedback information, the method further comprises:
    sending, to the second device, a third sector sweep frame of second beamforming training; and
    receiving, from the second device based on the second beamforming training, sector selection information or signal-to-noise ratio (SNR) information.

12. The method of claim 11, wherein the first ISS is an initiator transmitter sector sweep (TXSS), and the second beamforming training is an initiator receive sector sweep (RXSS), or wherein the first ISS is the initiator RXSS, and the second beamforming training is the initiator TXSS.

13. A computer program product comprising computer-executable instructions stored on a non-transitory computer-readable medium that, when executed by one or more processors, cause a first device to:
    send, to a second device, first indication information, wherein the first indication information is configured to instruct the second device to not perform a first responder sector sweep (RSS);
    receive, from the second device, a first sector sweep frame of first beamforming training, wherein an address of the first device does not match a receive address of the first sector sweep frame;
    send, to the second device after receiving the first sector sweep frame, a second first sector sweep frame of a first initiator sector sweep (ISS); and
    receive, from the second device in response to the second first sector sweep frame, feedback information.

14. The computer program product of claim 13, wherein before sending the second sector sweep frame, the instructions further cause the first device to determine, based on the first sector sweep frame, sector selection information or signal-to-noise ratio (SNR) information.

15. The computer program product of claim 14, wherein the first beamforming training comprises a second ISS of the second device, a second RSS of the second device, or the second ISS and the second RSS.

16. The computer program product of claim 14, wherein the instructions further cause the first device to determine, based on the first sector sweep frame, the sector selection information when the first beamforming training comprises a transmit sector sweep (TXSS) of the second device.

17. The computer program product of claim 14, wherein the instructions further cause the first device to:
- receive, from the second device, a first quantity of third sector sweep frames;
- determine whether the first quantity is greater than or equal to a second quantity of receive sectors that the first device needs to sweep when the first beamforming training comprises a receive sector sweep (RXSS); and
- determine, based on the first sector sweep frame, SNR information of a transmit sector of the first device when the first quantity is greater than or equal to the second quantity.

18. The computer program product of claim 17, wherein the instructions further cause the first device to send, to the second device, second indication information when the first quantity is less than the second quantity, and wherein the second indication information indicates RXSS length information of a responder RXSS of the second device after the ISS of the first device.

19. The computer program product of claim 14, wherein the first indication information is the sector selection information or the SNR information.

20. A first device, comprising:

a memory configured to store instructions; and one or more processors coupled to the memory and configured to execute the instructions to cause the first device to:
- send, to a second device, first indication information, wherein the first indication information is configured to instruct the first device to not perform a first responder sector sweep (RSS);
- receive, from the second device, a first sector sweep frame of first beamforming training, wherein an address of the first device does not match a receive address of the first sector sweep frame;
- send, to the second device after receiving the first sector sweep frame, a second sector sweep frame of a first initiator sector sweep (ISS); and
- receive, from the first device in response to the second sector sweep frame, feedback information.

* * * * *

UNITED STATES PATENT AND TRADEMARK OFFICE
CERTIFICATE OF CORRECTION

Page 1 of 1

PATENT NO. : 11,855,723 B2
APPLICATION NO. : 17/375656
DATED : December 26, 2023
INVENTOR(S) : Dejian Li and Jinnan Liu It is certified that error appears in the above-identified patent and that said Letters Patent is hereby corrected as shown below:

In the Claims

Claim 5, Column 35, Line 64: "determining, based on the first second sector sweep frame," should read "determining, based on the first sector sweep frame,"

Claim 13, Column 36, Line 50: "sweep frame, a second first sector sweep frame of a first" should read "sweep frame, a second sector sweep frame of a first"

Claim 13, Column 36, Line 53: "first sector sweep frame, feedback information." should read "sector sweep frame, feedback information."

Signed and Sealed this
Twenty-third Day of April, 2024

Katherine Kelly Vidal
*Director of the United States Patent and Trademark Office*